(12) United States Patent
Bora

(10) Patent No.: US 12,554,336 B2
(45) Date of Patent: Feb. 17, 2026

(54) WEARABLE KEYBOARD FOR ELECTRONIC DEVICES

(71) Applicant: Bora Innovations, LLC, Prosper, TX (US)

(72) Inventor: Swapnil Bora, Prosper, TX (US)

(*) Notice: Subject to any disclaimer, the term of this patent is extended or adjusted under 35 U.S.C. 154(b) by 0 days.

(21) Appl. No.: 18/129,555

(22) Filed: Mar. 31, 2023

(65) Prior Publication Data

US 2024/0329754 A1 Oct. 3, 2024

(51) Int. Cl.
*G06F 3/02* (2006.01)
*G06F 3/0354* (2013.01)
*G06F 3/04886* (2022.01)

(52) U.S. Cl.
CPC .......... *G06F 3/0221* (2013.01); *G06F 3/0213* (2013.01); *G06F 3/03547* (2013.01); *G06F 3/04886* (2013.01); *G06F 2203/0331* (2013.01)

(58) Field of Classification Search
CPC .. G06F 3/0221; G06F 3/0213; G06F 3/03547; G06F 3/04886; G06F 2203/0331
See application file for complete search history.

(56) References Cited

U.S. PATENT DOCUMENTS

| 8,605,036 | B1 | 12/2013 | Kelly | |
| 2004/0196265 | A1* | 10/2004 | Nohr | H04M 1/724095 |
| | | | | 345/169 |
| 2011/0266316 | A1* | 11/2011 | Ghalib | A45F 5/00 |
| | | | | 224/217 |
| 2013/0146625 | A1* | 6/2013 | Karle | A44C 9/0061 |
| | | | | 224/217 |
| 2017/0177140 | A1 | 6/2017 | Lee | |
| 2018/0307268 | A1* | 10/2018 | Stotler | G06F 1/1626 |
| 2019/0122022 | A1* | 4/2019 | Wu | G06V 40/1329 |
| 2020/0241641 | A1* | 7/2020 | Vescovi | G06F 21/31 |
| 2022/0253093 | A1* | 8/2022 | Berliner | G06F 3/1423 |

FOREIGN PATENT DOCUMENTS

EP 34111849 A1 2/2019

OTHER PUBLICATIONS

United States Patent & Trademark Office (ISA) International Search Report and Written Opinion for PCT/US2023/017143 dated Jun. 20, 2023, 14 pp.

* cited by examiner

*Primary Examiner* — Jonathan A Boyd
(74) *Attorney, Agent, or Firm* — Daniel J. Chalker; Edwin S. Flores; Chalker Flores, LLP

(57) ABSTRACT

A wearable input device can be worn by a user on one or more fingers. The wearable input device includes a ring and a keyboard. The ring includes a frame defining a space to receive a finger of the user. The keyboard is attached to the frame. In some embodiments, the keyboard is removably attached to the frame. The user wears the wearable input device on the one or more fingers and uses the keyboard to communicate with one or more application devices communicatively coupled with the keyboard.

27 Claims, 20 Drawing Sheets

WEARABLE KEYBOARD FOR ELECTRONIC DEVICES

CROSS-REFERENCE TO RELATED APPLICATIONS

None.

TECHNICAL FIELD OF THE INVENTION

Various embodiments of the disclosure relate generally to the field of input device technology, and more particularly, to a wearable keyboard for electronic devices such as a computer, a mobile device, an augmented reality (AR) device, or the like. The disclosed keyboard offers a portable, compact, wearable, and hands-free way to enter text, navigate cursors, and perform other tasks.

STATEMENT OF FEDERALLY FUNDED RESEARCH

Not applicable.

BACKGROUND OF THE INVENTION

Without limiting the scope of the invention, its background is described in connection with keyboards for electronic devices.

A keyboard is an input device used to enter text, numbers, and other characters into a computer or other electronic device. It typically consists of a set of keys arranged in a specific pattern and connected to the computer through a cable or wirelessly via Bluetooth or another wireless technology. Keyboards have been an integral part of computing since the early days of typewriters, and they continue to play a vital role in modern computing. The current form of available keyboards includes a wide variety of designs, from traditional desktop keyboards to compact and portable keyboards for mobile devices. Traditional desktop keyboards typically feature a full-sized layout with a numeric keypad, function keys, and a variety of additional keys for controlling various functions. They are designed to be used on a flat surface such as a desk and may connect to a computer via a wired USB connection or wirelessly via Bluetooth or other wireless technology.

In recent years, there has been a trend towards more compact and portable keyboards that are designed for use with mobile devices such as smartphones and tablets. These keyboards may be foldable or rollable, and they typically connect to the mobile device via Bluetooth or a wired connection.

While traditional keyboards are highly functional and efficient for many tasks, there are situations where they are not practical or convenient to use. For example, if you need to enter text while standing or walking, a traditional keyboard is not a viable option. Similarly, if you need to use both hands to perform a task, such as repairing a piece of equipment or conducting a field survey, a traditional keyboard may be cumbersome or impractical. Thus, there is a need for a technical solution that solves the existing problems of the prior art. The present disclosure describes various embodiments of a wearable keyboard that offer a solution to these existing challenges.

SUMMARY OF THE INVENTION

This summary should not be construed as limiting the scope of the present invention in any way.

Certain embodiments of the disclosure may be found in a disclosed wearable input device (i.e., a wearable keyboard) for performing and controlling one or more features and functionalities of one or more electronic devices. More specifically, various embodiments of the disclosure relate to the wearable keyboard that can be used to interact with one or more external electronic devices to input text, characters, codes, data, and other inputs required in the AR/VR and other related applications enabling user interface. Although various embodiments of the present disclosure are suitable for a wide scope of applications, they are particularly suitable for enhanced portability of the input device with a simple setup and configuration.

In an embodiment of the present disclosure, the wearable input device may be connected to one or more electronic devices (such as a computer, a mobile device, an augmented reality (AR) device, a virtual reality (VR) device, or the like) over a wired or wireless communication network. The wearable input device includes a ring comprising a frame defining a space to receive a finger of a user. The wearable input device further includes a keyboard attached to the frame. In some embodiments, the keyboard is removably attached to the frame. Further, the user wears the wearable input device and uses the keyboard to communicate with one or more application devices (such as the computer, mobile device, AR device, VR device, or the like) communicatively coupled with the keyboard.

In an exemplary embodiment, the wearable input device further comprises one or more slots on the frame, wherein the keyboard is removably attached to the one or more slots.

In an exemplary embodiment, the one or more slots in the ring may correspond to at least one or more magnetic slots, snap-fit slots, screwing slots, plug-in slots, or any combination thereof.

In an exemplary embodiment, the ring may be made of at least one of a plastic material, an elastic material, a metallic material, a wooden material, or any combination thereof.

In an exemplary embodiment, a size of the ring is adjustable (e.g., a one-size-fits-all that can fit into anyone's finger).

In an exemplary embodiment, the keyboard comprises a battery holder for one or more batteries that can be used as a power source for the keyboard.

In an exemplary embodiment, the keyboard further comprises a connector configured to transfer data, provide power, or charge one or more batteries.

In an exemplary embodiment, the keyboard further comprises one or more indication lights configured to indicate at least one of an ON/OFF status of the keyboard, a pairing/unpairing status, an error status, an update status, or a high/low charging level of one or more batteries.

In an exemplary embodiment, the keyboard further comprises a small projector (e.g., a miniature LED or laser projector, etc.) configured to project an image of a simulated keyboard onto a flat surface, such as a desk or a wall.

In an exemplary embodiment, the keyboard further comprises a plurality of physical keys including at least one of alphanumeric keys, control keys, function keys, navigation keys, and special purpose keys, wherein the special purpose keys enhance a security of the keyboard.

In an exemplary embodiment, the keyboard is commissioned or configured for one or more functionalities using a software application.

In an exemplary embodiment, the special purpose keys are integrated with one or more fingerprint sensors for verifying the fingerprint of the user.

In an exemplary embodiment, the special purpose keys are integrated with one or more camera sensors for performing picture recognition and one or more microphone sensors for performing voice recognition.

In an exemplary embodiment, the special purpose keys are integrated with one or more gesture sensors that capture one or more gestures of the user and accordingly executing one or more operations associated with the one or more gestures.

In an exemplary embodiment, the keyboard further comprises a pen holder for holding a stylus pen that can be used for operating one or more of the plurality of physical keys.

In an exemplary embodiment, the one or more gesture sensors comprise two-dimensional (2D) gesture sensors that sense movement of one or more fingers in a 2D frame, or three-dimensional (3D) gesture sensors that sense movement of the one or more fingers in a 3D frame, or a combination thereof. In some embodiments, the gesture sensors are based on radio frequency (RF), infrared (IR), ultrasonic, time-of-flight (TOF), capacitive, or various other technologies.

In an exemplary embodiment, the one or more operations simulate a mouse or touch pad functionality in an area of the keyboard.

In an exemplary embodiment, a gesture corresponding to the movement of one or more fingers in a horizontal plane may be used for simulating the movement of a cursor on a screen, and a gesture corresponding to the movement of one or more fingers in a vertical plane may use for simulating one or more taps or movement in the vertical plane, or vice-versa.

In an exemplary embodiment, the keyboard further comprises a touchscreen comprising a touch panel, a display panel, or a combination thereof.

In an exemplary embodiment, the keyboard further comprises a wireless or wired communication interface that communicates with the one or more application devices.

In an exemplary embodiment, the keyboard further comprises one or more activation/deactivation keys that are configured to activate or deactivate the keyboard, or one or more functions of the keyboard (e.g., typing, sensor(s), moving the cursor, etc.).

In an exemplary embodiment, the keyboard further comprises a touchpad including a plurality of touchpad units (TPUs). Each TPU may include at least one of one or more electrical parts or components including metal, electrical pad, electrical resistor, capacitor, inductor, diode, transistor, or magnet.

In an exemplary embodiment, the keyboard further comprises a glove or a wearable tip configured to complete an electrical connection between two adjacent TPUs, and a processor in the keyboard that receives one or more signals based on the completed electrical connection and executes one or more related operations in response to the one or more signals.

In an exemplary embodiment, a virtual keyboard is projected onto a flat surface or a display screen of one of the one or more application devices, and the virtual keyboard corresponds to the keyboard.

In an exemplary embodiment, the keyboard is calibrated automatically or calibrated with a software application, and one or more user preferences are displayed onto the display screen.

In another embodiment of the present disclosure, the wearable keyboard device may include a ring-shaped body configured to fit around a user's finger. The wearable keyboard device may further include a touch-based keyboard sensor disposed on the ring-shaped body. The wearable keyboard device may further include a processor/controller connected to the touch-based keyboard sensor. The wearable keyboard device may further include an IR transmitter and receiver sensor(s) on the edges of the body which simulates the touchpad, wherein the interruptions in IR signal can detect the finger position in multiple XY planes. The wearable keyboard device may further include a power source. The wearable keyboard device may further include a display, wherein the wearable keyboard device is configured to project the keyboard on the display of a device or a wearable device. The wearable keyboard device may also include additional features such as a vibration motor for haptic feedback, a finger glove for closing the circuit while typing, and low power projected capacitive touchpad technology. The disclosed keyboard may be a replica of a keyboard that is seen on a smartphone, laptop, or other devices, and the user may have the option to choose the layout of the keyboard on the display of the wearable keyboard. Additionally, multiple wearable keyboard devices may be used in combination with each other and with other devices, such as AR/VR devices, to enable typing and other functions.

In another embodiment of the present disclosure, a method for inputting data into an electronic device includes: providing a wearable keyboard comprising a ring configured to be worn on a finger, and a keyboard located on the ring; projecting a virtual keyboard onto a display screen of an electronic device when the keyboard is turned ON, wherein the virtual keyboard corresponds to the keyboard, and the keyboard is used to input data that is visible on the virtual keyboard; and controlling the projected virtual keyboard using the keyboard.

In an exemplary embodiment, the method further comprises commissioning or configuring the device using a software application.

In an exemplary embodiment, the method further comprises configuring the device for one or more functionalities using a software application.

In an exemplary embodiment, the wearable device includes any of the elements or features previously described.

In another embodiment of the present disclosure, a method for operating a wearable keyboard includes: providing the wearable keyboard comprising a ring configured to be worn on a finger, and a keyboard located on the ring; communicatively connecting the keyboard with an external device via a wireless or wired communication network; detecting an input on the keyboard; transmitting the input to the external device using the wireless or wired communication network; controlling one or more operations related to what is being displayed on the external device using the transmitted input; and displaying an output of the one or more controlled operations on the external device that visually depicts one or more effects of the input on the keyboard.

In an exemplary embodiment, the method further comprises commissioning or configuring the device for one or more functionalities using a software application.

In an exemplary embodiment, the wearable device includes any of the elements or features previously described.

These and other features and advantages of the present disclosure may be appreciated from a review of the following detailed description of the present disclosure, along with the accompanying figures in which like reference numerals refer to like parts throughout.

BRIEF DESCRIPTION OF THE DRAWINGS

The accompanying drawings illustrate the various embodiments of systems, methods, and other aspects of the disclosure. It will be apparent to a person skilled in the art that the illustrated element boundaries (e.g., boxes, groups of boxes, or other shapes) in the figures represent one example of the boundaries. In some examples, one element may be designed as multiple elements, or multiple elements may be designed as one element. In some examples, an element shown as an internal component of one element may be implemented as an external component in another and vice versa.

Various embodiments of the disclosure are illustrated by way of example, and not limited by the appended figures, in which like references indicate similar elements.

Figure 1A:
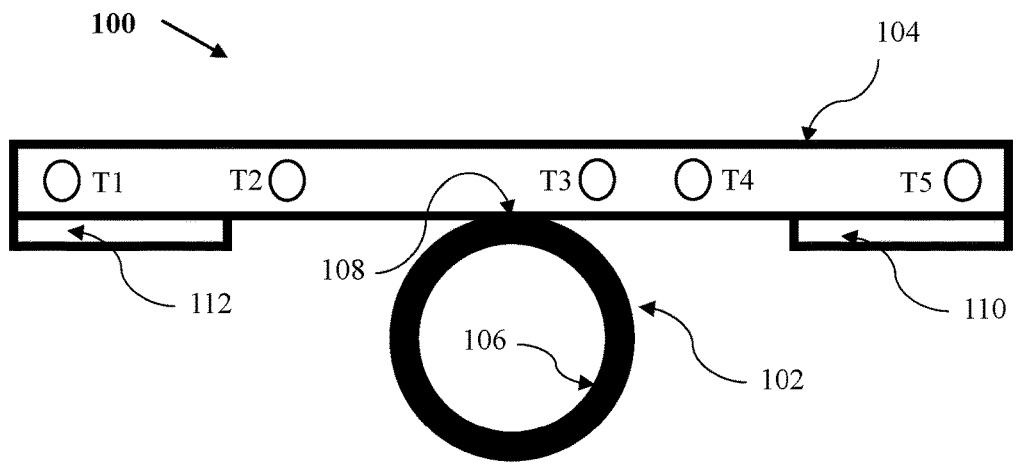
FIG. 1a is a block diagram that illustrates a side view of a wearable input device, in accordance with an exemplary embodiment of the disclosure.

Further areas of applicability of the disclosure will become apparent from the detailed description provided hereinafter. The detailed description of exemplary embodiments is intended for illustration purposes only and is, therefore, not intended to necessarily limit the scope of the disclosure.

DETAILED DESCRIPTION OF THE INVENTION

While the making and using of various embodiments of the present disclosure are discussed in detail below, it should be appreciated that the present disclosure provides many applicable inventive concepts that can be embodied in a wide variety of specific contexts. The specific embodiments discussed herein are merely illustrative of specific ways to make and use the invention and do not delimit the scope of the invention.

To facilitate the understanding of this invention, a number of terms are defined below. Terms defined herein have meanings as commonly understood by a person of ordinary skill in the areas relevant to the present invention. The terminology herein is used to describe specific embodiments of the invention, but their usage does not limit the invention, except as outlined in the claims.

Various methods are described below to provide an example of each claimed embodiment. They do not limit any claimed embodiment. Any claimed embodiment may cover methods that are different from those described above and below. The drawings and descriptions are for illustrative, rather than restrictive, purposes.

The disclosure is best understood with reference to the detailed figures and description set forth herein. Various embodiments are discussed below with reference to the figures. However, those skilled in the art will readily appreciate that the detailed descriptions given herein with respect to the figures are simply for explanatory purposes as the methods, systems, and apparatuses may extend beyond the described embodiments. In one example, the teachings presented, and the needs of a particular application may yield multiple alternate and suitable approaches to implement the functionality of any detail described herein. Therefore, any approach may extend beyond the implementation choices in the following embodiments that are described and shown.

References to "an embodiment", "another embodiment", "yet another embodiment", "one example", "another example", "yet another example", "for example", and so on, indicate that the embodiment(s) or example(s) so described may include a particular feature, structure, characteristic, property, element, or limitation, but that not every embodiment or example necessarily includes that particular feature, structure, characteristic, property, element or limitation. Furthermore, repeated use of the phrase "in an embodiment" does not necessarily refer to the same embodiment. The words "comprising", "having", "containing", and "including", and other forms thereof, are intended to be equivalent in meaning and be open-ended in that an item or items following any one of these words is not meant to be an exhaustive listing of such item or items or meant to be limited to only the listed item or items.

As used in the specification, the singular forms "a", "an" and "the" may also include plural references. For example, the term "an article" may include a plurality of articles. The use of the word "a" or "an" when used in conjunction with the term "comprising" in the claims and/or the specification may mean "one," but it is also consistent with the meaning of "one or more," "at least one," and "one or more than one." The use of the term "or" in the claims is used to mean "and/or" unless explicitly indicated to refer to alternatives only or the alternatives are mutually exclusive, although the disclosure supports a definition that refers to only alternatives and "and/or."

As used in this specification and claim(s), the words "comprising" (and any form of comprising, such as "comprise" and "comprises"), "having" (and any form of having, such as "have" and "has"), "including" (and any form of including, such as "includes" and "include") or "containing" (and any form of containing, such as "contains" and "contain") are inclusive or open-ended and do not exclude additional, unrecited features, elements, components, groups, integers, and/or steps, but do not exclude the presence of other unstated features, elements, components, groups, integers and/or steps. In embodiments of any of the compositions and methods provided herein, "comprising" may be replaced with "consisting essentially of" or "consisting of". As used herein, the term "consisting" is used to indicate the presence of the recited integer (e.g., a feature, an element, a characteristic, a property, a method/process step or a limitation) or group of integers (e.g., feature(s), element(s), characteristic(s), property(ies), method/process steps or limitation(s)) only. As used herein, the phrase "consisting essentially of" requires the specified features, elements, components, groups, integers, and/or steps, but do not exclude the presence of other unstated features, elements, components, groups, integers and/or steps as well as those that do not materially affect the basic and novel characteristic(s) and/or function of the claimed invention.

The term "or combinations thereof" as used herein refers to all permutations and combinations of the listed items preceding the term. For example, "A, B, C, or combinations thereof" is intended to include at least one of: A, B, C, AB, AC, BC, or ABC, and if order is important in a particular context, also BA, CA, CB, CBA, BCA, ACB, BAC, or CAB. Continuing with this example, expressly included are combinations that contain repeats of one or more item or term, such as BB, AAA, AB, BBC, AAABCCCC, CBBAAA, CABABB, and so forth. The skilled artisan will understand that typically there is no limit on the number of items or terms in any combination, unless otherwise apparent from the context.

As used herein, words of approximation such as, without limitation, "about", "substantial" or "substantially" refers to a condition that when so modified is understood to not necessarily be absolute or perfect but would be considered close enough to those of ordinary skill in the art to warrant designating the condition as being present. The extent to which the description may vary will depend on how great a change can be instituted and still have one of ordinary skill in the art recognize the modified feature as still having the required characteristics and capabilities of the unmodified feature. In general, but subject to the preceding discussion, a numerical value herein that is modified by a word of approximation such as "about" may vary from the stated value by at least #1, 2, 3, 4, 5, 6, 7, 10, 12 or 15%.

It will be understood that particular embodiments described herein are shown by way of illustration and not as limitations of the invention. The principal features of this invention can be employed in various embodiments without departing from the concept, spirit and scope of the invention. Those skilled in the art will recognize or be able to ascertain using no more than routine experimentation, numerous equivalents to the specific procedures described herein. Such equivalents are considered to be within the scope of this invention and are covered by the claims.

Those with ordinary skill in the art will appreciate that the elements in the figures are illustrated for simplicity and clarity and are not necessarily drawn to scale. There may be additional components or processes described in the foregoing application that are not depicted on the described drawings. In the event such a component or process is described, but not depicted in a drawing, the absence of such component and process from the drawings should not be considered as an omission of such design from the specification.

All publications and patent applications mentioned in the specification are indicative of the level of skill of those skilled in the art to which this invention pertains. All publications and patent applications are herein incorporated by reference to the same extent as if each individual publication or patent application was specifically and individually indicated to be incorporated by reference.

Further, it should be observed that embodiments of the present invention utilize a combination of components or processes, which constitute a wearable input device (i.e., a wearable keyboard) for performing and controlling one or more features and functionalities of electronic devices. Accordingly, the components or processes have been represented, showing only specific details that are pertinent for an understanding of the present invention so as not to obscure the disclosure with details that will be readily apparent to those with ordinary skill in the art having the benefit of the description herein. As required, detailed embodiments of the present invention are disclosed herein; however, it is to be understood that the disclosed embodiments are merely exemplary of the invention, which can be embodied in various forms. Therefore, specific component-level details and functional details disclosed herein are not to be interpreted as limiting, but merely as a basis for the claims and as a representative basis for teaching one skilled in the art to variously employ the present invention in virtually any appropriately detailed structure. Further, the terms and phrases used herein are not intended to be limiting but rather to provide an understandable description of the invention.

More specifically, a keyboard is an input device used to enter text, numbers, and other characters into a computer or other electronic device. It typically consists of a set of keys arranged in a specific pattern and connected to the computer through a cable or wirelessly via Bluetooth or another wireless technology. When a key is pressed on the keyboard, it sends a signal to the computer, which then processes the input and performs the corresponding action, such as displaying a character on the screen or executing a command. Keyboards are an essential part of most computer setups and are used in a wide range of applications, including word processing, gaming, programming, and more.

The present invention discloses a wearable keyboard that offers a solution to prior art challenges by providing a portable and hands-free way to enter text and perform other tasks. These keyboards may be worn on a body part, such as on a finger or a wrist, or attached to a glove, and may be connected to the one or more application devices wirelessly or over a wired connection.

One of the primary benefits of wearable keyboards is that they allow users to enter text or perform other tasks while on the go or in situations where a traditional keyboard is not practical. This can be particularly useful for workers in fields such as healthcare, construction, or manufacturing, where mobility and hands-free operation are essential. In addition, wearable keyboards can be helpful for people with disabilities or mobility impairments, as they provide an alternative to traditional keyboards that may be difficult to use.

Overall, the need for a wearable keyboard is driven by the increasing demand for mobility and hands-free operation in a wide range of industries and applications. As technology continues to evolve, we can expect to see further innovation in the design and functionality of wearable keyboards, making them an increasingly important tool for computing and communication, especially in augmented or virtual reality eyeglasses or headset type of devices which need simple input devices to input text, move cursor, navigate in various dimensions displayed on a screen or projected on the user's eyes.

Now, the present invention will be described in detail for a better understanding of the disclosed features and functionalities associated with the wearable keyboard.

FIG. 1a is a block diagram that illustrates a side view of a wearable input device 100, in accordance with an exemplary embodiment of the disclosure. The wearable input device 100 may correspond to a wearable keyboard 100 and includes a wearable device, such as a ring 102, and an electronic input device, such as a keyboard 104. Hereinafter, the wearable input device 100 and the wearable keyboard 100 may be interchangeably used without limiting the scope of the present invention. Moreover, the ring 102 may be any shape or material that can be placed on a finger of a user and support the keyboard 104. In some embodiments, the keyboard 104 is attached to the ring 102. In other embodiments, the keyboard 104 is removably attached to the ring 102.

In an embodiment, the ring 102 is a small circular or other shapes-based band that can be worn on a finger. The ring 102 may be made from a wide variety of materials, such as gold, silver, platinum, plastic, wood, elastic, or any other metallic or non-metallic materials known in the art. Further, in an embodiment, the keyboard 104 is an input device used to enter text, numbers, and other characters into a computer or other electronic device that is connected to the keyboard 104 via a wireless or wired communication network. The keyboard 104 typically consists of a set of keys arranged in a specific pattern and connected to the computer through a cable or wirelessly via Bluetooth or another wireless technology. The ring 102 in the wearable keyboard 100 is not limited to a circular shape and can have various other shapes to cater to the user's comfort and preferences. For instance, the ring 102 can be oval or oblong in shape, providing a broader contact area with the user's finger. Additionally, the ring 102 can have a curved shape, conforming to the shape of the user's finger. Another example is the ring 102 with an adjustable size, allowing the user to customize the size of the ring 102 based on their finger size. The ring 102 can also have an ergonomic design, providing additional comfort during long typing sessions. Ultimately, the shape of the ring 102 depends on the design and functionality of the wearable keyboard 100, with the primary focus on user comfort and ease of use.

In an embodiment, the wearable keyboard 100 that includes the finger ring 102 is a type of input device that is designed to be worn on the finger and used to enter text or control a computer or mobile device. The wearable keyboard 100 may consist of a small, compact keyboard 104 that is attached to the finger ring 102, allowing a user to type or input commands without the need for a desk or other flat surface. The keyboard 104 itself may feature a standard layout of keys, including letters, numbers, punctuation marks, emojis, and function keys, and may be removably attached to the finger ring 102 (i.e., may be attached or detached as per the user's convenience and requirement). The ring 102 may be made from a flexible or adjustable material to fit various finger sizes comfortably.

In an embodiment, the wearable keyboard 100 that include the finger ring 102 and the keyboard 104 may be particularly useful in situations where it is not practical or convenient to use a traditional keyboard, such as when using a mobile device while standing or walking or while engaging in Augmented reality (AR) and/or Virtual reality (AR) applications. They can also be helpful for people with disabilities or mobility impairments who may have difficulty using a standard keyboard. Furthermore, in AR or VR applications, the glasses or headset may cover the user's eyes or the user might be moving, creating a limitation of using the external keyboards. Overall, the combination of the finger ring 102 and the keyboard 104 in a wearable device provides a convenient and versatile input option for users who need to enter text or control any application device while on the go or in situations where a traditional keyboard or other input device is not practical or may be expensive.

In an embodiment, the ring 102 may include a frame 106 defining a space to receive a wearing finger of the user. This means that the ring 102 is designed to fit around a finger and is shaped in a way that creates a space for the finger to be placed inside the ring 102. This is a common feature of finger rings and ensures that the ring 102 fits comfortably and securely on the finger. For example, imagine the wearable input device 100 that includes the finger ring 102 and the keyboard 104. The ring 102 may be made of a material (such as a plastic material, an elastic material, a metallic material, a wooden material, or any combination thereof) and have a circular frame 106 that defines a space for the user's finger. The frame 106 could be sized to fit various finger sizes and shaped to provide a comfortable fit. Further, the ring 102 may be an adjustable ring that is designated to be a one-size-fits-all that can fit into anyone's finger.

Further, in an embodiment, the ring 102 or frame 106 may include one or more slots 108 on an outer surface of the frame 106. This means that the ring 102 may have one or more openings or channels on the outside of the ring frame 106. These slots 108 may be used to attach or hold other components of the keyboard 104. For example, in the wearable keyboard 100 described above, the ring frame 106 may include the one or more slots 108 on the outside surface of the ring 102. These slots 108 may be positioned to allow the keyboard 104 to be attached to the ring 102 in a specific location or orientation. The one or more slots 108 may correspond to at least one or more magnetic slots, snap-fit slots, screwing slots, plug-in slots, or any combination thereof but should not be construed as limiting to the scope of the present invention.

In an exemplary embodiment, the magnetic slot for attaching the keyboard 104 to the ring 102 may correspond to a type of fastening mechanism where a small, magnetic slot is located on the outer surface of the ring 102, and a corresponding magnetic strip is located on the back of the keyboard 104. The magnet in the slot 108 and the strip on the keyboard 104 create a strong bond when they are brought into contact, holding the keyboard 104 in place on the ring 102. This type of attachment mechanism is a popular option for wearable keyboards because it provides a secure hold for the keyboard 104 while still allowing for easy removal and attachment. The magnetic slot is typically small and discreet, so it does not interfere with the overall design or comfort of the ring 102. To use a magnetic slot to attach the keyboard 104 to the ring 102, the user would simply place the keyboard 104 in close proximity to the slot 108 and allow the magnet to pull the two components together. The strong bond created by the magnet ensures that the keyboard 104 remains securely attached to the ring 102 during use. Overall, the magnetic slot attachment mechanism is a convenient and practical option for creating the wearable keyboard 100 that includes the ring 102 and the keyboard 104. It provides a strong hold for the keyboard 104 while still allowing for easy removal and attachment, making it an ideal option for users who need to switch between wearing the ring 102 and using the keyboard 104 separately.

In an exemplary embodiment, the snap-fit slot for attaching the keyboard 104 to the ring 102 may correspond to a type of fastening mechanism where a small slot is located on the outer surface of the ring 102, and the keyboard 104 has a corresponding tab or protrusion that snaps into the slot to hold the keyboard 104 in place. This type of attachment mechanism is a popular option for wearable keyboards because it provides a secure hold for the keyboard 104 while still allowing for easy removal and attachment. The snap-fit slot is typically small and discreet, so it does not interfere with the overall design or comfort of the ring 102. To use the snap-fit slot to attach the keyboard 104 to the ring 102, the user would simply align the tab or protrusion on the keyboard 104 with the slot 108 on the ring 102 and apply pressure to snap the two components together. The secure snap-fit ensures that the keyboard 104 remains securely attached to the ring 102 during use.

In an exemplary embodiment, the screwing slot for attaching the keyboard 104 to the ring 102 refers to a type of fastening mechanism where a small slot is located on the outer surface of the ring 102, and the keyboard 104 has a corresponding threaded hole that can accept a screw. The screw is then inserted into the hole and tightened to secure the keyboard 104 in place. This type of attachment mechanism may provide a more secure hold than some other methods. It may be typically used when a stronger attachment is needed, such as for heavy or bulky keyboards. To use a screwing slot to attach the keyboard 104 to the ring 102, the user would first align the threaded hole on the keyboard 104 with the slot 108 on the ring 102. A small screw would then be inserted into the hole and tightened using a screwdriver or other tool to secure the keyboard 104 in place. The screwing slot attachment mechanism is a less convenient option for creating the wearable keyboard 100 that includes the ring 102 and the keyboard 104, as it requires additional hardware and tools to install and remove the keyboard 104. However, it provides a more secure hold for heavy or bulky keyboards, making it an ideal option for users who need a stronger attachment.

In an exemplary embodiment, the plug-in slot for attaching the keyboard 104 to the ring 102 refers to a type of fastening mechanism where a small slot is located on the outer surface of the ring 102, and the keyboard 104 has a corresponding plug or connector that fits into the slot to hold the keyboard 104 in place. This type of attachment mechanism is commonly used for smaller and lighter keyboards. The plug-in slot is typically small and discreet, so it does not interfere with the overall design or comfort of the ring 102. To use a plug-in slot to attach the keyboard 104 to the ring 102, the user would simply insert the plug or connector on the keyboard 104 into the slot 108 on the ring 102, creating a secure hold for the keyboard 104. Some plug-in slots may have additional features to lock the keyboard 104 in place, such as a small tab that can be flipped up to prevent accidental detachment. The plug-in slot attachment mechanism may be a convenient and practical option that provides a secure hold for the keyboard 104 while still allowing for easy removal and attachment, making it an ideal option for users who need to switch between wearing the ring 102 and using the keyboard 104 separately.

Further, irrespective of the type of slots, the keyboard 104 may be removably attached to the one or more slots, as discussed above. This means that the keyboard 104 is designed to be attached to the ring 102 via the slots 108 on the outer surface of the ring frame 106. The keyboard 104 may be easily removed or attached to the ring 102, allowing the user to switch between wearing the ring 102 and using the keyboard 104 separately. For example, in the wearable keyboard 100 described above, the keyboard 104 may be designed to fit into at least one slot 108 on the ring frame 106 and be held in place by a locking mechanism or other fastening method. The keyboard 104 may be removed from the ring 102 when not needed, allowing the user to wear the ring 102 as a standalone accessory and the keyboard 104 can still be used as a standalone input device. Overall, the combination of the finger ring 102 and the keyboard 104 that attaches to the ring 102 via the one or more slots 108 on the outer surface of the ring frame 106 creates a practical and versatile wearable keyboard 100. The ring 102 provides a secure and comfortable fit for the user's finger, while the removable keyboard 104 provides a convenient input method for controlling any device. For example, the user may wear the wearable input device 100 on the wearing finger and uses the keyboard 104 on the wearing finger to communicate with the one or more application devices (such as a computer, laptop, smartphone, AR/VR device, or the like) communicatively coupled with the keyboard 104. In some embodiments, the keyboard 104 may not be detachable from the ring 102. In such scenario, the wearable keyboard 100 including the ring 102 and the keyboard 104 may be designed and manufactured as a single unit with a provision to rotate the keyboard 104 along one or more axes of the ring 102.

In some embodiments, the wearable keyboard 100 may be designed with multiple rings that can fit onto multiple fingers of the user's hand. This can provide additional stability and support to the wearable keyboard 100 while in use and can also allow for more complex and varied finger gestures to be used for input. In this case, the keyboard 104 may be removably attached to two or more rings that can fit onto two or more fingers of the user's hand.

Further, in an embodiment, to function, the keyboard 104 requires a power source, which is typically a battery. The keyboard 104 may include one or more battery holder cabinets 110 for holding one or more batteries that can be used as a power source for the keyboard 104. The keyboard 104 that includes the one or more battery holders 110 is designed to hold the one or more batteries that can be used as a power source for the keyboard 104. Each battery holder 110 is a compartment or cavity in the keyboard 104 where the one or more batteries are inserted and held securely in place. The battery holder 110 may be located along a side edge of the keyboard 104, as this is a convenient and accessible location that does not interfere with the main functionality of the keyboard 104. However, the battery holder 110 may also be located elsewhere, depending on the specific design of the keyboard 104. For example, some keyboards may have the battery holder 110 located on the underside of the device, or in a separate compartment that is detachable from the main keyboard body. Further, the size and shape of the battery holder 110 may vary depending on the specific type of battery used and the overall design of the keyboard 104. Some battery holders are designed to hold a single battery, while others can hold multiple batteries in parallel or series to provide additional power or longer battery life. The battery holder 110 is an important component of the keyboard 104, as it provides the power source necessary to operate the device. By including at least one battery holder 110 in the design of the keyboard 104, the users can enjoy the convenience of a portable, wireless device that can be used without being tethered to a power outlet or USB port. The battery can be a flexible or thin sheet battery as well. Further, the battery is a rechargeable battery that can be charged and used repeatedly. In the context of the wearable keyboard 100, the rechargeable battery may allow for the keyboard 104 to be used without the need for constant replacement of disposable batteries. This would make the keyboard 104 more convenient and cost-effective for the user. The rechargeable battery may be built into the keyboard 104 or attached as a separate component. It can be charged using a USB cable, a charging dock, or wireless charging technology. The battery life can vary depending on the capacity and usage of the keyboard 104, but typically lasts for several hours of continuous use. The rechargeable battery may also include features such as overcharge protection, which prevents the battery from being overcharged and potentially damaging the battery or the device. Additionally, the battery may have a low power indicator to alert the user when the battery is running low and needs to be charged.

Further, the standard specifications for a battery that can be used with the keyboard 104 may vary depending on the specific model of the keyboard 104 and the manufacturer's recommendations. However, there are some general guidelines that can be followed when choosing a battery for use with a compact keyboard. One common type of battery used with the keyboard 104 is the alkaline battery. These batteries are widely available and are often used in a variety of electronic devices, including computer peripherals. The most common sizes of alkaline batteries used with compact keyboards are AA and AAA. When choosing a battery for a compact keyboard, it is important to consider the battery's capacity, voltage, and chemistry. The capacity refers to the amount of energy stored in the battery and is typically measured in milliampere-hours (mAh). The higher the capacity, the longer the battery will last before needing to be replaced or recharged. The voltage of the battery should match the voltage requirements of the keyboard, which is typically around 3 volts. The chemistry of the battery is also an important consideration. Alkaline batteries are a common choice, but other types of batteries, such as lithium or nickel-metal hydride (NiMH), may be used as well. Lithium batteries tend to have a higher capacity and longer lifespan than alkaline batteries, but they may be more expensive. NiMH batteries are rechargeable and may be a good option for users who prefer a more eco-friendly and cost-effective solution. For the purpose of easy explanation, the standard specifications for a battery used with a compact keyboard may include a capacity of at least 1000 mAh, a voltage of around 3 volts, and a chemistry that is compatible with the keyboard's requirements. It is always important to refer to the manufacturer's recommendations when selecting a battery for use with a specific keyboard model. The battery can be in the coin cell form or a sheet form or a flexible sheet form as well. The battery can be rechargeable and can be recharged with an external power source, wired or wirelessly. The battery can be a super capacitor type as well.

Further, in an embodiment, the keyboard 104 may include one or more connectors 112 that can be used for at least one of data transferring, powering, or battery charging but should not be construed as limiting to the scope of the present invention. The connector 112 is an important component of the keyboard 104, as it enables the keyboard 104 to communicate with other devices and power sources. The keyboard 104 that includes the connector 112 typically includes a port or interface that can be used for at least one of data transferring, powering, or battery charging. The connector 112 may be located along a side edge of the keyboard 104. The type of connector used may vary depending on the specific design of the keyboard, but common types of connectors include USB, Lightning, and micro-USB. The data transferring function of the connector 112 allows the keyboard 104 to communicate with other devices, such as a computer or tablet. This enables the user to enter text or commands into the device and to control various functions of the device using the keyboard 104. The powering function of the connector 112 allows the keyboard 104 to receive power from an external source, such as a USB port or a power adapter. This is particularly useful for users who prefer a wired connection or who need to conserve battery power. The battery charging function of the connector 112 allows the keyboard 104 to recharge its internal battery, if it has one. This is typically done by connecting the keyboard 104 to a power source using a charging cable that is compatible with the connector 112. The location of the connector 112 may vary depending on the specific design of the keyboard 104. In some cases, the connector may be located on the underside of the keyboard 104, while in other cases, it may be located on a separate module that is detachable from the main keyboard body. The connector is an important component of the keyboard 104, as it enables the keyboard 104 to communicate with other devices and power sources. By including the connector 112 in the design of the keyboard 104, the users can enjoy the convenience of a versatile and flexible input device that can be used in a variety of different ways.

Further, in an embodiment, the keyboard 104 may include one or more indicator buttons (as shown by T1, T2, T3, T4, and T5), which when turned ON, are configured to generate one or more types of lights of one or more colors or configure the keyboard 104 for specific feature. The lights may be configured to indicate at least one of an ON/OFF status of the keyboard 104, a pairing/unpairing status of the keyboard 104 with external device(s), an error status of the keyboard 104, an update status of the keyboard 104, or a high/low charging level of one or more batteries of the keyboard 104. The inclusion of the indication buttons (as shown by T1, T2, T3, T4, and T5) in the keyboard 104 may provide users with a quick and easy way to check the status of the device, as well as to be alerted to any potential issues or updates. The indicator buttons (as shown by T1, T2, T3, T4, and T5) may be located anywhere on the keyboard 104 and thus should not be construed as limiting based on what has been shown in FIG. 1. In this case, the keyboard 104 includes the indication buttons that, when turned on, generate lights that can be used to convey important information to the user. The lights generated by the indication buttons may be configured to indicate a variety of different status conditions. For example, they may indicate the on/off status, pairing/unpairing status, error status, update status, or high/low charging level of one or more batteries of the keyboard 104. Some examples of these different status conditions and how they might be indicated are:

On/off status: When the keyboard 104 is turned ON, an indication button (say, T1) may light up to indicate that the device is active and ready for use. When the keyboard 104 is turned OFF, the lights may turn off as well.

Pairing/unpairing status: If the keyboard 104 is being paired or unpaired with another device, an indication button (say, T2) may blink in a certain pattern to indicate this process is happening. For example, they might blink rapidly to indicate that the device is actively searching for a connection, or blink slowly to indicate that the pairing process is complete.

Error status: If an error occurs with the keyboard 104, such as a malfunction or a connection issue, an indication button (say, T3) may flash in a specific pattern or color to indicate that there is a problem.

Update status: If the keyboard 104 is receiving an update or firmware upgrade, an indication button (say, T4) may flash to indicate that the update is in progress. Once the update is complete, the lights may turn OFF or change to a different color or pattern.

Charging level: If the keyboard 104 includes a battery holder for holding one or more batteries, an indication button (say, T5) may be used to indicate the high/low charging level of the batteries. For example, the lights may turn green when the battery level is high, and red when the battery level is low.

Overall, the inclusion of the indication buttons (as shown by T1, T2, T3, T4, and T5) in the keyboard 104 may provide the users with important information about the status of the device, as well as make it easier to troubleshoot any issues that may arise. By configuring the lights to indicate different status conditions, the users can quickly and easily determine what is happening with their keyboard 104 and take an appropriate action.

Figure 1B:
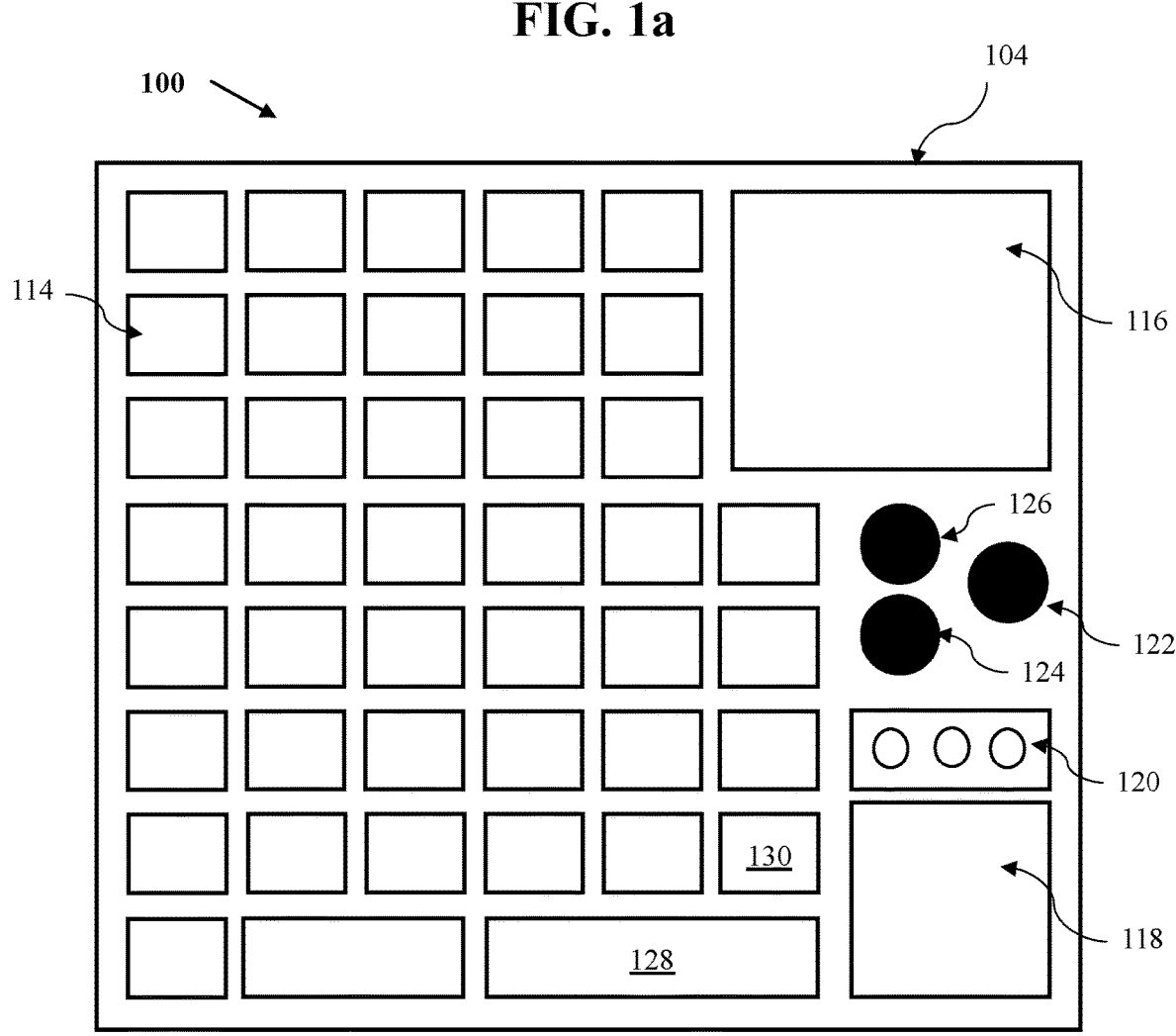
FIG. 1b is a block diagram that illustrates a top view of the wearable input device, in accordance with an exemplary embodiment of the disclosure.

FIG. 1b is a block diagram that illustrates a top view of the wearable input device 100, in accordance with an exemplary embodiment of the disclosure. The ring 102 (as shown in FIG. 1a) is not visible here in FIG. 1b because the ring 102 is located beneath the keyboard 104. In FIG. 1b, the keyboard 104 shows physical keys or touch-based keys 114, a display 116, a touch pad 118, keys and indicators 120, special purpose keys 122, 124, and 126, and a pen holder 128.

In an embodiment, the keyboard 104 may be provided with existing designs or new designs for the keys and their layout. For example, the keyboard 104 may have a replica keyboard on the wearable keyboard 100 to mimic the design and layout of keyboards commonly found on smartphones, laptops, and other devices. This design approach is intended to help users feel more comfortable and familiar with the wearable keyboard 100 as they are already accustomed to the layout and design of traditional keyboards. By replicating the standard keyboard layout, the users will not have to learn a new layout or spend additional time adjusting to the new layout. This can make the wearable keyboard 100 easier to use and reduce the amount of time required to become proficient in using the device. Additionally, the use of a familiar layout can improve typing accuracy and speed. For example, if a user is used to typing on a QWERTY keyboard on their smartphone, the wearable keyboard 100 can replicate that same layout. This allows the user to type on the wearable keyboard 100 using the same muscle memory and typing techniques that they are used to, resulting in a more natural typing experience. Overall, replicating a known keyboard layout can improve user comfort, typing accuracy, and speed when using the wearable keyboard 100. The user may be provided with options to choose the layout of the keyboard 104 on a display of the wearable keyboard 100. The ability to choose the layout of the keyboard 104 on the display of the wearable keyboard 100 is an important feature that allows the users to personalize their typing experience. Different users may have different preferences when it comes to keyboard layouts. For example, some users may prefer the traditional QWERTY layout, while others may prefer a Dvorak layout, or a layout optimized for their native language. By providing the option to choose the layout, the users can select the most convenient layout for their typing needs. This can improve typing speed and accuracy and make the experience of using the wearable keyboard 100 more comfortable and enjoyable. Additionally, the ability to change the layout on the fly can be useful in situations where the user needs to switch between different languages or typing styles.

In an embodiment, the keyboard 104 may include a plurality of physical keys 114 including at least one of the alphanumeric keys, control keys, function keys, and navigation keys. One of the most important aspects of any keyboard is the layout of the keys 114. the keyboard 104 may include a wide range of different keys, each with its own function and purpose. For example, the keyboard 104 includes the plurality of physical keys 114, including at least one of the alphanumeric keys, control keys, function keys, emoji keys, and navigation keys. In some embodiments, the keyboard 104 may include touch-based keys 114 instead of physical keys. The touch-based keys 114 refer to a type of keys that do not have physical buttons but instead have a touch-sensitive surface. These keys 114 use capacitive sensing technology to detect the user's touch and register the input. When the user touches the surface of the key, a small electrical charge is transferred to their finger, which is then detected by the sensor underneath the surface. The key then registers the input and sends the corresponding signal to the device it is connected to. Touch-based keys 114 are commonly used in modern smartphones, tablets, and other electronic devices with touchscreens. They provide a sleek, modern look and feel and are often more durable than physical keys since they have no moving parts that can wear out over time.

The alphanumeric keys are the most common type of keys found on the keyboard 104. They include the letters of the alphabet, as well as numbers and punctuation marks. These keys are used for typing text and other characters into a computer or other electronic device. For example, if you want to type the letter "A" into a document, you would press the "A" key on the keyboard 104.

Further, the control keys are used to perform specific functions on the computer or electronic device. These keys are usually located at the bottom or top of the keyboard 104 and include keys such as Ctrl, Alt, and Shift. They are often used in combination with other keys to perform a specific action. For example, Ctrl+C is used to copy text, while Ctrl+V is used to paste copied text. Further, one or more keys may be configured to perform one or more specific actions.

Further, the function keys are a set of keys at the top of the keyboard 104 that are numbered F1 to F12. They are used to perform a variety of functions, depending on the software application being used. For example, in many word processing programs, the F1 key is used to open the help menu, while the F5 key is used to refresh the page.

Further, the navigation keys are used to move the cursor or selection around on the screen. These keys include the arrow keys, which are used to move the cursor up, down, left, or right, and the Home, End, Page Up, and Page Down keys, which are used to quickly navigate through a document or webpage.

The inclusion of the keys 114, including alphanumeric keys, control keys, function keys, and navigation keys, makes the keyboard 104 a versatile and essential input device for computer and other electronic devices. The various keys on the keyboard 104 allow users to enter text, perform specific functions, and navigate through documents and webpages with ease.

In an embodiment, the keyboard 104 may include the pen holder 128 for holding a stylus pen. The users may use the pen for operating one or more of the keys 114 presented on the display 116. The keyboard 104 with the pen holder 128 may be designed to provide the users with an additional input option for operating the keys, either the physical or virtual keys. The stylus pen is a digital pen that is used for writing, drawing, or operating touch screens. The pen holder 128 on the keyboard 104 may be designed to securely hold the stylus pen when it is not in use. The holder 128 may be located at various positions on the keyboard, depending on the design of the keyboard, for example, it may be located on its surface or along one of its edges. The use of the stylus pen with the keyboard 104 provides the users with a more precise and accurate input method. This is particularly useful for tasks such as drawing, writing, or selecting small items on a small keyboard or its screen. The technology involved in using the stylus pen with the keyboard 104 includes capacitive touch technology and electromagnetic resonance technology. The capacitive touch technology is used in touchscreens and works by detecting changes in capacitance when an object, such as a finger or stylus, comes into contact with the screen. This technology relies on the electrical conductivity of the object being used to detect its presence on the screen. The electromagnetic resonance technology, also known as electromagnetic induction technology, is used in stylus pens and works by creating a magnetic field between the pen and the screen. The screen then detects changes in the magnetic field as the pen moves across the screen. This technology is more accurate than capacitive touch technology, allowing for more precise input and better handwriting recognition.

In order to use the stylus pen with the keyboard 104, the pen holder 128 may be designed to allow easy access to the pen. When the pen is removed from the holder 128, it can be used to operate the physical keys on the keyboard 104. This provides the users with an additional input option for operating the keyboard 104, which can be particularly useful for tasks that require precision or a different input method than typing on the physical keys. Moreover, the use of the pen holder 128 and the stylus pen with the keyboard 104 provides the users with a more versatile input option for operating the keys.

In an embodiment, the keyboard 104 may further include one or more special purpose keys such as the special purpose keys 122, 124, and 126 that are provided for enhancing security.

In an exemplary embodiment, the special purpose keys 122, 124, and 126 may be integrated with one or more fingerprint sensors for verifying a fingerprint of the user. The integration of the special purpose keys 122, 124, and 126 with fingerprint sensors on the keyboard 104 is a security feature that provides the users with a quick and convenient way to verify their identity when using the device. The special purpose keys 122, 124, and 126 may be programmed to perform specific tasks such as opening a particular application or executing a shortcut. The technology involved in integrating fingerprint sensors with the special purpose keys 122, 124, and 126 includes biometric authentication and cryptography. The biometric authentication is a security process that uses unique physical characteristics such as fingerprints, facial recognition, or voice recognition to verify the identity of a user. Fingerprint sensors are the most commonly used biometric authentication technology, and they work by capturing an image of the user's fingerprint and comparing it to a stored record of the user's fingerprint to verify their identity. The cryptography is used to secure the communication between the fingerprint sensor and the keyboard's circuitry. The fingerprint data is encrypted before it is transmitted to the keyboard's processor, and only the encrypted data is stored on the device. This prevents unauthorized access to the user's fingerprint data. Examples of special purpose keys on the keyboard 104 with integrated fingerprint sensors could include a "lock" key that locks the computer and requires a fingerprint scan to unlock it, or a "payment" key that securely enters payment information for online transactions. The fingerprint sensor would be located on the key itself, and the user would simply place their finger on the sensor to verify their identity. The integration of the special purpose keys 122, 124, and 126 with fingerprint sensors on the keyboard 104 provides the users with a convenient and secure way to access their device and perform specific tasks. Furthermore, the processor and the communicably coupled memory can be used to store the external passwords as a password manager device for various online and offline accounts. The keyboard can store a password or a key to confirm the password for one or more access of online or offline applications. The keyboard's processor can internally have or communicably coupled with the Real Time Clock with its own battery so the keyboard is aware of its time that can be used for various security and cryptography purposes. The keyboard is thus capable of carrying monetary/payments transactions in online offline modes as NFC based payment cards do and synch with the actual system later.

In an exemplary embodiment, the special purpose keys 122, 124, and 126 may be further integrated with one or more camera sensors for performing picture recognition and one or more microphone sensors for performing voice recognition. The integration of the special purpose keys 122, 124, and 126 with one or more camera and microphone sensors on the keyboard 104 is a feature that provides the users with a quick and convenient way to perform picture recognition and voice recognition. The picture recognition refers to the process of identifying and classifying objects within an image, while the voice recognition refers to the process of identifying and transcribing spoken words. The technology involved in this feature includes image processing, machine learning, and speech recognition. Image processing is the technology used to analyze the data captured by the camera sensors. Machine learning algorithms are then applied to the processed data to identify objects within the image. This process can be used to perform a variety of tasks, such as identifying faces, reading barcodes, or scanning documents. Speech recognition involves the use of microphone sensors to capture spoken words, which are then processed and analyzed to transcribe the speech into text. This technology is used in a variety of applications, including virtual assistants, speech-to-text applications, and automated voice response systems. Examples of the special purpose keys 122, 124, and 126 on the keyboard 104 with integrated the camera and microphone sensors could include a "scan" key that uses the camera sensor to scan documents or barcodes, or a "voice command" key that uses the microphone sensor to capture spoken commands for use with virtual assistants or other applications. Moreover, the integration of the special purpose keys 122, 124, and 126 with camera and microphone sensors on the keyboard 104 provides the users with a convenient and efficient way to perform picture recognition and voice recognition tasks. The technology involved in this feature includes image processing, machine learning, and speech recognition, which work together to provide accurate and reliable results.

In an exemplary embodiment, the special purpose keys 122, 124, and 126 may be integrated with one or more gesture sensors for capturing one or more gestures of the user and accordingly executing one or more related operations. The one or more gesture sensors may include two-dimensional (2D) or three-dimensional (3D) gesture sensors, or a combination thereof. The 2D gesture sensors may be configured to sense movement of one or more fingers in a 2D frame, and the 3D gesture sensors may be configured to sense movement of the one or more fingers in a 3D frame. The gesture capturing may be used for simulating a mouse or touch pad functionality in a smaller area of the keyboard 104.

The special purpose keys 122, 124, and 126 that are integrated with the one or more gesture sensors allows the user to capture one or more gestures and execute related operations. These gesture sensors can include 2D or 3D sensors or a combination of both. The 2D gesture sensors can sense movement of one or more fingers in a 2D frame, whereas the 3D gesture sensors can sense movement of the fingers in a 3D frame. This allows for more precise and intuitive input than traditional keyboards. The gesture capturing can be used to simulate a mouse or touchpad functionality in a smaller area of the keyboard 104. For example, a gesture corresponding to movement of one or more fingers in a horizontal plane may be used for simulating movement of a cursor on a screen, and a gesture corresponding to movement of one or more fingers in a vertical plane may be used for simulating one or more taps or movement in the vertical plane. The gesture sensors may include capacitive, IR, RF, ultrasonic, optical, camera, TOF, or other gesture sensors. Capacitive sensors detect changes in electrical charge on a surface, such as a user's finger, while optical sensors use light to detect changes in position or movement. Associated technologies for this type of keyboard 104 may include machine learning algorithms, computer vision technology, and various types of sensors, such as optical sensors, infrared sensors, or ultrasonic sensors. Machine learning algorithms may be used to analyze the gesture data and recognize different types of gestures. Computer vision technology may be used to capture and analyze the visual information and identify the specific gesture being made. Different types of sensors may be used to capture the gesture data, depending on the specific implementation of the keyboard 104.

In some other embodiment, the keyboard 104 may also be configured to identify touch gestures that are performed on or near the keyboard surface, and the keyboard processor is programmed to interpret these touch gestures as one or more actions. The keyboard 104 incorporates one or more touch sensors that are designed to detect touch gestures on or near the keyboard surface, and the keyboard processor analyses the touch gestures identified by the touch sensors to generate one or more actions. The keyboard 104 may be configured to detect various touch gestures made on or near the keyboard surface, and the keyboard processor is programmed to classify these touch gestures into different categories, such as typing gestures, click gestures, time-based gestures, or tracking gestures. The special purpose keys 122, 124, and 126 may each include a key surface, a touch-sensor layer, and a support. The touch-sensor layer may include a capacitive surface, which may include multiple individual touch-sensitive conduits arranged across each individual key. As an example, the user may have an option to utilize the gesture sensors, for inputting a variety of different gestures. These gestures can be made in one or more of the X, Y and Z axes, including combinations of gestures that may be in multiple axes. The available gestures include, among others, typing, clicking, how long a figure is in a particular position, and tracking gestures, which can be executed using one or more fingertips. A typing gesture may involve inputting a keystroke by directing a gesture in the Z-axis direction, which is intended by the user to input a specific key on the keyboard 104. Conversely, a click gesture may involve directing a gesture in the Z-axis direction to indicate a selection input, including selecting an object, copying, pasting, tapping, cutting, or performing other click-related actions instead of keystrokes. Finally, a tracking gesture may include directing gestures in both the X and Y axes and is intended by the user for actions such as cursor movement, sliding movement, and dragging movement. The entire keyboard 104 may receive and interpret any of these different types of gestures. All this functionality can be carried with a touchpad sensor including but not limited to touchscreen sensor as well and doesn't have to be restricted to a gesture sensor.

In some embodiments, the IR transmitter and receiver sensor(s) may be integrated on the edges of the wearable keyboard 100 which simulates its touchpad. The IR transmitter and receiver sensor(s) on the edges of the wearable keyboard 100 are used to simulate a touchpad on the wearable keyboard 100. This technology is used to detect the position of the user's finger on the surface of the keyboard 104. The IR transmitter and receiver sensors are located on the edges of the wearable keyboard 100 and they work by interrupting the IR signal from one side to the opposite side-left side edge to right side edge, and top side edge to bottom side edge. When the user touches the surface of the keyboard 104, the interruption in the IR signal is detected by the sensors. By analyzing the interruption in the IR signal, the position of the user's finger on the surface of the keyboard 104 can be determined in multiple XY planes. This allows for a more accurate detection of the user's finger position, not just on the pad, but also in 3D space relative to the surface. For example, if the user moves their finger slightly above the surface of the keyboard 104, the IR transmitter and receiver sensors will detect the interruption in the IR signal and determine the position of the finger in the XY plane above the surface. This technology allows for more precise control of the cursor on the screen and can also enable new types of gesture-based interaction.

Overall, this type of keyboard 104 including the special purpose keys 122, 124, and 126 allows for a more intuitive and efficient way of interacting with a computer, as it can provide a more natural and intuitive input method. It can also be especially useful in small spaces, where a traditional mouse or touchpad may not be practical.

In an embodiment, the keyboard 104 may further include a touchscreen 116 which is an assembly of both a touch panel, a display panel, or a combination thereof. The keyboard 104 with the touchscreen 116 is a type of keyboard that integrates a touch-sensitive screen into its design, allowing the users to interact with the keyboard 104 through a combination of the physical keys and on-screen touch controls. The keyboard touchscreen display 116 may be used for typing, accessing functions and customizing the keyboard layout. The display technologies compatible with the keyboard touchscreen 116 may include but are not limited to resistive, capacitive, infrared, and surface acoustic wave (SAW) touchscreens.

Resistive touchscreens work by sensing the pressure on the screen. They have a flexible top layer made of plastic and a rigid bottom layer made of glass. When the user presses the top layer, it makes contact with the bottom layer, which creates a change in the electrical current, and the point of contact is detected.

Capacitive touchscreens work by sensing the electrical charge of the user's finger. They have a thin layer of conducting material (usually indium tin oxide) on the surface of the screen. When the user touches the screen, it changes the electrical charge at that point, which is detected by the sensors.

Infrared touchscreens use an array of infrared sensors around the edge of the screen. When the user touches the screen, it interrupts the beams of infrared light, which is detected by the sensors, and the point of contact is calculated.

Surface acoustic wave touchscreens use ultrasonic waves that are transmitted across the surface of the screen. When the user touches the screen, it absorbs some of the energy of the waves, and the point of contact is detected.

Moreover, the keyboard 104 with the touchscreen display 116 provides a flexible and customizable interface for the users to interact with their computers. It allows for a variety of inputs and can be adapted to the user's preferences and needs. There are several types of display technologies that can be integrated with the keyboard 104, depending on the intended use and design of the device. Here are some common display technologies that can be used with the keyboard 104:

Liquid Crystal Displays (LCDs): LCDs are the most common type of display used in keyboards. They work by manipulating light through liquid crystals to display images or characters. LCD displays are available in both monochrome and color options, and they are often used in small screens for embedded systems, mobile devices, and other compact electronics.

Organic Light Emitting Diode (OLED) Displays: OLED displays are thinner, lighter, and more power-efficient than LCD displays. OLEDs generate light through organic materials, and they do not require a backlight. OLEDs are often used in mobile devices, TVs, and other consumer electronics.

Electronic Paper Displays (EPDs): EPDs use electronic ink technology to display static images or text. They are commonly used in e-readers and other portable devices that require low power consumption and may give long battery life.

Light Emitting Diode (LED) Displays: LED displays are commonly used in keyboards for gaming and other applications that require high brightness and vivid colors. LED displays use an array of light-emitting diodes to create a bright and sharp display.

Projection Displays: Projection displays project a virtual keyboard onto a flat surface using a laser or LED light source. These displays are often used in industrial applications, such as in medical devices, where a touch-free interface is desired.

In an embodiment, the keyboard 104 may further include the touch pad 118 including a plurality of touch pad units (TPUs). The touch pad 118 may be integrated into the keyboard 104, and allows the user to control the cursor without using an external mouse. The touch pad 118 may include the TPUs. Each TPU includes at least one electrical component, such as a metal component, electrical pad, electrical resistor, capacitor, inductor, diode, or transistor. These components are arranged in a circuit that detects the position of a user's finger on the touch pad 118, and converts this information into cursor movement on the computer screen. For example, when a user moves their finger across the touch pad, the electrical components in the TPUs detect the movement and send signals to the keyboard processor. The keyboard processor then moves the cursor on the screen in response to the movement of the user's finger on the touch pad 118. The use of TPUs in the touch pad 118 may allow for precise and accurate tracking of the user's finger movements, which is critical for accurate cursor movement. The type and number of electrical components included in each TPU can vary depending on the specific design and requirements of the touch pad. The touch pad 118 integrated into the keyboard 104 may provide a convenient and efficient way for the users to control the cursor on a screen without the need for an external mouse. It can also save desk space and reduce clutter by eliminating the need for a separate pointing device.

In an embodiment, the keyboard 104 may further include the keys and indicators 120. The keys may correspond to activation/deactivation key(s) that can be used for activating or deactivating the keyboard 104 including activating or deactivating one or more specific functionalities including at least activating or deactivating typing, sensor(s), or moving cursor. The indicator key, when turned ON, generate lights that can be used to convey important information to the user. The lights generated by the indicator key may be configured to indicate a variety of different status conditions. For example, they may indicate the on/off status, pairing/unpairing status, error status, update status, or high/low charging level of one or more batteries of the keyboard 104.

In an exemplary embodiment, the activation/deactivation key(s) on the keyboard 104 are special keys that can be used to turn the keyboard 104 ON or OFF or to activate or deactivate specific functionalities of the keyboard 104. These functionalities may include typing, sensor(s), or moving the cursor but should not be construed as limiting to the scope of the present invention. When the keyboard 104 is turned ON, it is ready for use, and the user can start typing or using any other functionalities of the keyboard 104. However, if the user wants to temporarily disable certain features of the keyboard 104, such as the sensor(s) or the ability to move the cursor, the user can use the activation/deactivation key(s) to turn OFF those specific functionalities. This can be useful in situations where the user only wants to use the keyboard 104 for typing and doesn't want any accidental inputs from the sensor(s) or the cursor movement. The activation/deactivation key(s) work by sending a signal to the keyboard's control circuitry when the key is pressed. The control circuitry then interprets this signal and determines which functionalities of the keyboard 104 to activate or deactivate. For example, if the user presses the activation/deactivation key for the sensor(s), the control circuitry will disable the sensors and prevent them from sending any input signals to the computer. In some keyboards 104, there may be multiple activation/deactivation keys, each controlling a different functionality. The keys may be labeled with symbols or icons that indicate their specific functions, making it easy for the user to understand which functionalities are being activated or deactivated. Additionally, some keyboards may allow the user to customize the functionalities that are activated or deactivated by the activation/deactivation keys, giving the user more control over the keyboard's behavior.

In an embodiment, the keyboard 104 may further include a communication module 130 that is configured to facilitate a wireless communication or a wired communication with the one or more application devices. The communication module 130 in the keyboard 104 is a device that enables the keyboard 104 to communicate with other devices, such as a computer, laptop, mobile phone, AR/VR devices, or the like. It allows for the transmission of data between the keyboard 104 and the connected device. The communication module 130 may be either a wireless module or a wired module.

The wireless communication module 130 may allow for wireless communication between the keyboard 104 and the connected device. Examples of wireless communication modules include Bluetooth, Wi-Fi, NFC (Near Field Communication) and infrared (IR) communication. Bluetooth is the most commonly used wireless communication technology for keyboards, as it allows for a reliable, low-power connection between the keyboard 104 and the connected device.

The wired communication module 130 may allow for wired communication between the keyboard 104 and the connected device. Examples of the wired communication modules include USB, PS/2, and serial communication. USB is the most commonly used wired communication technology for keyboards, as it allows for high-speed, reliable communication between the keyboard 104 and the connected device.

The communication module 130 in the keyboard 104 may enable various functionalities. For example, it can be used to transfer data from the keyboard 104 to the connected device, such as text typed on the keyboard. It can also be used to receive data from the connected device, such as commands to execute a specific function. In addition, it can be used to update firmware or software on the keyboard 104. The communication module 130 may also be used to facilitate a wireless connection between the keyboard 104 and other devices, such as a smartphone or a tablet. This enables the keyboard 104 to be used with various devices without the need for additional wired connections. Overall, the communication module 130 is an essential component of the keyboard 104, enabling it to communicate with other devices and perform various functionalities.

In an embodiment, the disclosed wearable input device (i.e., the wearable keyboard) 100 may configured to connect with the one or more application devices where a keypad is projected so that user's eyes can view the keyboard. In some situations, it may not be convenient for the user to look down at the wearable keyboard 100 while typing, especially if they are mobile or need to maintain a certain position. In such cases, the wearable keyboard 100 may be configured to connect with an application device that can project a virtual keyboard, allowing the user to view and type on the keyboard 104 without having to look down at their fingers. For example, a surgeon performing a delicate procedure may need to maintain a certain position and focus on the surgical field without looking away. In this case, the surgeon can use the wearable keyboard 100 and connect it to an application device, which can project a virtual keyboard onto a nearby screen. The surgeon can then use the wearable keyboard 100 to input data into the application without looking down, allowing them to maintain focus on the surgical field. Similarly, a pilot or a driver can use the wearable keyboard 100 and connect it to a display in the cockpit or dashboard of their vehicle. This allows them to input data into the navigation or entertainment systems without having to look down at the wearable keyboard 100. The technology that enables this kind of functionality is known as augmented reality (AR) or mixed reality (MR), which involves the projection of virtual images onto the real world. In this case, the virtual keyboard is projected onto a nearby surface, such as a screen, using a projector or a display. The wearable keyboard 100 is then used to input data, with the user viewing the virtual keyboard as if it were a physical keyboard in front of them.

The wearable keyboard 100 has the potential to revolutionize the way we interact with computers and other devices, providing a more portable, convenient, and customizable input solution for a variety of applications. The wearable keyboard 100 can have several applications in various fields. Here are some examples:

Mobile computing: The wearable keyboard 100 can be used with smartphones, tablets, and other mobile devices, allowing users to input text and commands without the need for a physical keyboard. This can be particularly useful for people who need to type a lot on the go, such as journalists, writers, and businesspeople.

Virtual and augmented reality: The wearable keyboards 100 can also be used in virtual and augmented reality environments, where traditional keyboards are impractical or impossible to use. This can allow users to input commands and text while immersed in virtual or augmented environments.

Healthcare: The wearable keyboards 100 can be useful in healthcare settings where hygiene is a concern, such as hospitals or clinics. Doctors and nurses can wear the keyboard 104 on their finger to input patient data, reducing the need for traditional keyboards that can harbor germs and bacteria.

Gaming: The wearable keyboards 100 can be used for gaming applications where traditional keyboards are not convenient or comfortable to use. This can allow gamers to input commands and text without the need for a bulky keyboard, and can also enable new types of gameplay that are not possible with traditional input devices.

Accessibility: The wearable keyboards 100 can be helpful for people with disabilities that make it difficult to use traditional keyboards. For example, people with limited mobility or dexterity may find it easier to use the wearable keyboard 100 than a traditional one. Additionally, the ability to customize a layout and key functions of the keyboard 104 can be useful for people with specific needs.

In an embodiment, the wearable keyboard 100 may also be configured to facilitate time sensitive or time-based key functions. These functions are a unique feature of the wearable keyboard 100 that allows users to perform certain functions by pressing a key for a specific amount of time. For example, if a user presses and holds the "C" key for a few seconds, it can trigger the copy function. The copy function can then be projected onto the user's eyes or shown on a nearby screen for visualization purposes. This feature is especially useful in situations where users need to perform tasks quickly and accurately, such as in a fast-paced work environment. The wearable keyboard's ability to display time-based key functions visually helps users keep track of their actions and increases their productivity by reducing the time spent on repetitive tasks. For example, when a user presses a specific key for a longer duration of time, it triggers a time-based key function, such as the copy, paste, or other operation functions. In the case of the wearable keyboard 100 with an AR/VR device or smart glasses, the copy function can be projected onto the device's display or directly onto the user's eyes. This allows the user to see a visual representation of the function they have triggered, which can be helpful for individuals who may have difficulty remembering or distinguishing between different key functions. For example, if a user needs to copy a piece of text, they can press and hold the designated key, and the copy function will be projected onto the display or directly onto the user's eyes, providing a visual confirmation of the function they have triggered.

Figure 2:
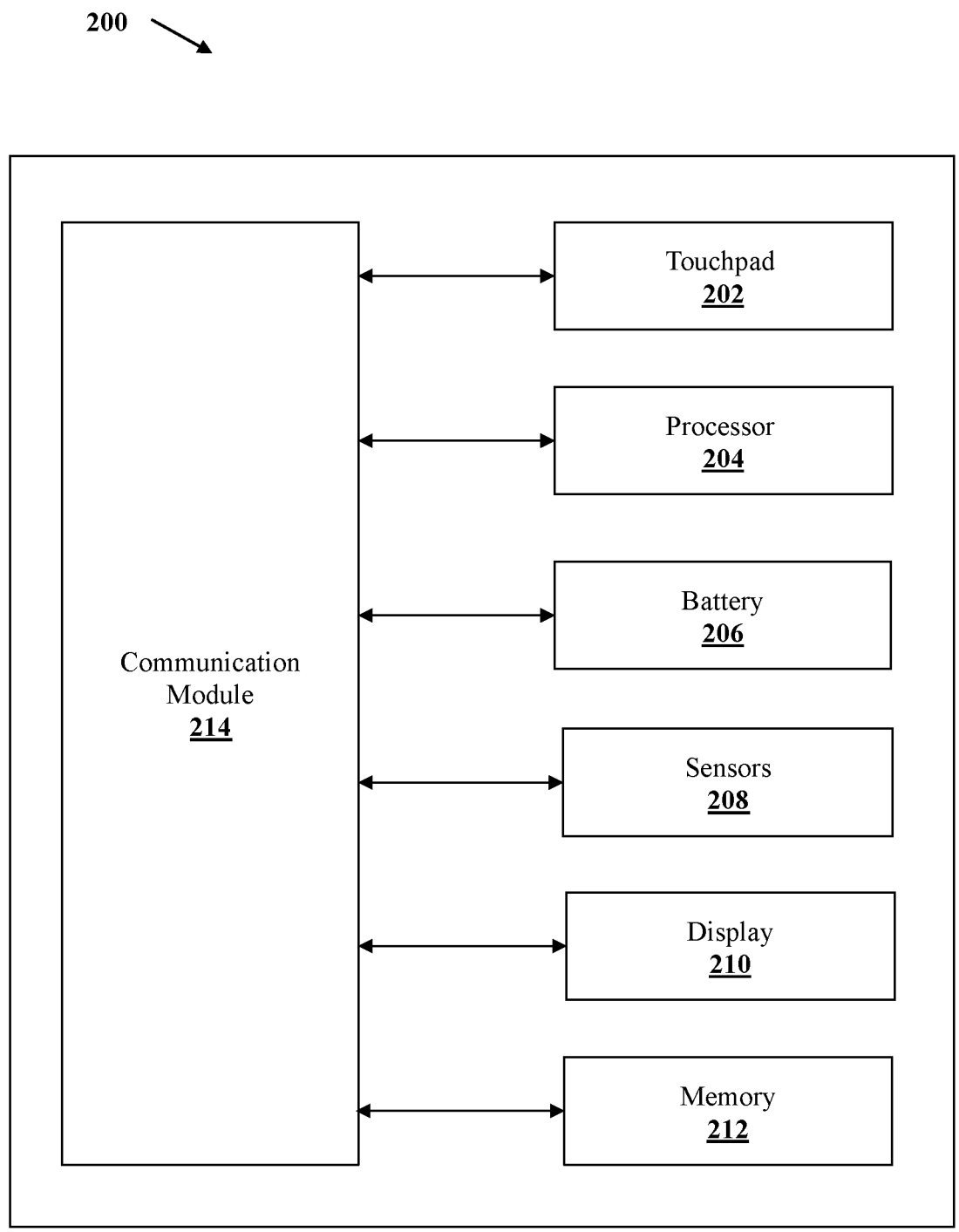
FIG. 2 is a block diagram that illustrates components of the wearable input device, in accordance with an exemplary embodiment of the disclosure.

FIG. 2 is a block diagram 200 that illustrates components of the wearable input device 100 of FIGS. 1a and 1b, in accordance with an exemplary embodiment of the disclosure. The wearable input device 100 may include one or more touchpads such as a touchpad 202, one or more processors such as a processor 204, one or more battery units such as a battery 206, one or more sensors such as sensors 208, one or more displays such as a display 210, and one or more memory units such as a memory 212. These components may be communicatively connected to a communication module 214.

In an embodiment, the wearable keyboard 100 (FIGS. 1a and 1b) needs a keypad or touchpad 202 (also shown by 118 in FIG. 1B) for inputting data and commands. The touchpad 202 is an important component of the wearable keyboard 100 that allows the user to perform a variety of input tasks. The touchpad 202 is a flat, rectangular surface that is typically made of plastic or glass. The touchpad 202 detects the user's finger movements and gestures, which are then translated into various actions by the keyboard's software. In the case of the wearable keyboard 100, the touchpad 202 is often much smaller than a traditional touchpad on a laptop or desktop computer, due to the limited size of the wearable device. However, it can still perform many of the same functions as a larger touchpad. The touchpad 202 may include one or more touch and/or gesture sensors, which detect the position and movement of the user's fingers. These sensors may be made of a variety of materials, including resistive, capacitive, or optical sensors. Resistive sensors work by detecting changes in electrical current caused by the user's finger, while capacitive sensors detect changes in electrical charge. Optical sensors work by detecting changes in the amount of light that passes through the touchpad 202. The touchpad 202 may be divided into separate sections or units, each of which corresponds to a different area on the screen. The user can move their finger over the touchpad 202 to control the movement of the cursor on the screen or perform other functions such as scrolling, tapping, and dragging.

In some embodiments, the touchpad 202 may be a low power projected capacitive touchpad that use capacitive sensing to detect the position of a user's finger on the touchpad surface. This technology uses an array of sensors to detect changes in capacitance when a finger or other conductive object touches the surface of the touchpad 202. Unlike traditional touchpads that require a physical connection between the finger and the touchpad surface, projected capacitive touchpads can sense the presence of a finger even before it touches the surface. This is achieved by projecting a capacitive field above the surface of the touchpad 202, which can detect the position of a finger or other conductive object as it approaches the touchpad 202. Low power projected capacitive touchpads are designed to be highly energy-efficient, consuming very little power during operation. This is achieved by using low-power microcontrollers and optimizing the touchpad sensing algorithms to minimize power consumption. Additionally, low power projected capacitive touchpads can be integrated with power management features such as automatic power-off and sleep modes to further reduce power consumption. Low power projected capacitive touchpads are commonly used in portable devices such as laptops, tablets, and smartphones, where energy efficiency is critical for maximizing battery life. They are also used in other applications where low power consumption is desirable, such as remote controls, home automation systems, and medical devices. The touchpad 202 is designed to consume minimal power and can be integrated into a variety of electronic devices, such as laptops, smartphones, and wearable keyboards 100. The ideal specifications for a low power projected capacitive touchpad include high sensitivity, low power consumption, and high resolution. These touchpads 202 are ideal for use in portable and battery-operated devices, as they require minimal power to operate and can help extend battery life.

In an embodiment, the processor 204 is responsible for processing the input signals received from the sensors and generating appropriate output signals. The processor can be a microcontroller or microprocessor and may be customized for the specific requirements of the wearable keyboard 100. It can be programmed with algorithms that interpret user inputs and trigger appropriate responses. The processor 204 is an important component of the wearable keyboard 100, responsible for performing the computational tasks necessary for the keyboard 104 to function. It is a hardware component that acts as the brain of the keyboard 104, interpreting user input and executing commands. The processor's speed and capabilities directly impact the speed and functionality of the keyboard 104. There are several types of processors 204 available for use in the keyboard 104, including application-specific integrated circuits (ASICs), field-programmable gate arrays (FPGAs), and microcontrollers. The processor 204 must be capable of processing touch input from the touchpad 202, interpreting gestures, and sending commands to the connected device. Additionally, it may need to perform tasks like wireless communication with other devices and data encryption to ensure the security of user input. The processor 204 must be able to do all of this while consuming as little power as possible, as the keyboard 104 is designed to be worn and used for extended periods without the need for frequent charging.

In an embodiment, the keyboard 104 needs a power source to operate. It can be the battery 206 or other power source, such as a solar cell or energy-harvesting device. The power source 206 must be compact and lightweight, as the keyboard 104 is designed to be worn by the user. It should also have a long battery life or be rechargeable, so that the keyboard 104 can be used for extended periods of time. The battery 206 is an essential component of the wearable keyboard 100 as it provides the power required to run the keyboard 104. The battery 206 may be responsible for supplying power to all the components of the keyboard 104, including the processor, touchpad, communication module, and other sensors. When selecting the battery 206, some of the key considerations include the size and weight of the battery, its capacity, and its power output. It is important to choose a battery that is small and lightweight so that it does not add too much weight to the wearable device. At the same time, the battery should have a sufficient capacity to ensure that the keyboard 104 can be used for a reasonable amount of time before it needs to be recharged. One common type of battery used in wearable devices is the lithium-ion battery. Lithium-ion batteries are popular because they are lightweight, have a high energy density, and can be recharged many times. Other types of batteries that can be used in wearable devices include zinc-carbon batteries, nickel-cadmium batteries, nickel-metal hydride batteries, flexible, and super capacitor. The battery 206 needs to be efficient and long-lasting to ensure that the keyboard 104 may be used for an extended period without needing to be recharged frequently. The battery 206 should also have built-in safety features such as overcharge protection and over-discharge protection to prevent damage to the battery 206 and ensure user safety. Some important functionality of the battery 206 in the keyboard 104 includes:

Power output: The battery needs to provide a consistent power output to ensure that the device operates smoothly and efficiently.

Charge time: The battery should be able to charge quickly so that the user can start using the device again without delay.

Battery life: The battery life should be long enough to provide extended use of the device without needing to recharge frequently.

Capacity: The battery capacity should be sufficient to power all the components of the wearable keyboard 100 for a reasonable amount of time.

Safety features: The battery should have built-in safety features to prevent overcharging, over-discharging, and overheating.

In an embodiment, the keyboard 104 includes the sensors 208. These are used to capture user inputs in the form of keystrokes, touch gestures, or other types of input. The keyboard 104 may include various types of sensors such as pressure sensors, capacitive touch sensors, and proximity sensors. These sensors can detect different types of input, including typing, clicking, and tracking gestures, which can be processed by the keyboard's processor. Other sensors may include camera sensors and microphone sensors. The camera sensors may be used for performing picture recognition and the microphone sensors may be used for performing voice recognition. The sensors 208 are essential components of the wearable keyboard 100 that allow the keyboard 104 to detect various inputs from the user, such as touch gestures, orientation, and motion. The following are some of the sensors that may be used in the keyboard 104:

Touch sensors: These sensors detect touch inputs made on or near the surface of the keyboard. They are typically capacitive sensors that measure changes in capacitance when a conductive object (such as a finger) comes into contact with the sensor.

Accelerometers: These sensors detect changes in acceleration and orientation. They are used to detect movement and can be used to track the orientation of the keyboard 104.

Gyroscopes: These sensors detect changes in orientation and angular velocity. They are used to measure rotational motion and can be used to track the movement of the keyboard 104.

Magnetometers: These sensors detect changes in magnetic fields. They are used to determine the orientation of the device relative to the Earth's magnetic field.

Proximity sensors: These sensors detect the presence of objects in close proximity to the device. They are typically used to detect when the device is being worn or to disable the touchpad when the user's hand is not near the device.

Camera sensors: These sensors may capture images and/or video, which can be useful in certain applications. For example, the wearable keyboard 100 for virtual reality applications may use camera sensors to capture the user's hand movements in 3D space, allowing the user to type in a virtual environment.

Microphone sensors: These sensors may be used to capture audio input from the user. This can be used, for example, in a voice-to-text input mode, allowing the user to dictate text rather than typing it out manually.

Gesture sensors: These sensors may detect the user's hand movements and translate them into actions. For example, the wearable keyboard 100 may use gesture sensors to detect swipe gestures for scrolling, or pinch gestures for zooming.

The touchpad sensors can also be considered gesture sensors, as they detect the user's finger movements and translate them into actions.

The specific sensors used in the wearable keyboard 100 may vary depending on the design of the keyboard 104 and the intended use case. For example, the wearable keyboard 100 designed for gaming may include additional sensors, such as pressure sensors, to detect the force of keypresses. The functionality of the sensors in the wearable keyboard 100 is to enable the keyboard 104 to detect and respond to user inputs. For example, touch sensors enable the keyboard 104 to detect touch gestures and translate them into actions, while motion sensors allow the keyboard 104 to track the movement and orientation of the user's hand. The sensors work in conjunction with the keyboard's processor 204 to process the input and generate the appropriate response, such as displaying a character on a screen or sending a command to an application.

In an embodiment, the keyboard 104 may include the display 210. The keyboard 104 may include the display 210 (also shown by 116 in FIG. 1*b*) to show the user the current mode of operation, battery life, or other relevant information. The display can be a small LED or OLED screen, or a projection display that project an image of the keyboard 104 onto a surface. The display component 210 may be responsible for presenting visual information to the user, such as text and graphics, as well as providing a means for the user to interact with the keyboard 104 or external devices. The display 210 may take different forms, depending on the design and intended use of the keyboard 104. One type of display 210 that may be used is a small OLED or LCD screen. These displays are thin and light, making them suitable for use in the wearable device. They are also low-power, which is important for extending the battery life of the device. OLED screens offer high contrast and deep blacks, while LCD screens are typically brighter and offer better color accuracy. Another type of display 210 that may be used is a projection display. In this type of display, the keyboard 104 projects a virtual image of keys onto a nearby surface, which the user can then interact with. This type of display is particularly well-suited to wearable devices, as it can be easily integrated into a small, portable form factor. The downside of projection displays is that they may not be as visible in bright light or outdoor environments. Regardless of the specific type of display used, there are a few important functionalities that the display component 210 should have. For example, it should be able to display clear, legible text, and graphics, and it should be responsive to the user input. It should also be designed to minimize power consumption, to extend the battery life, and it should be durable enough to withstand regular use and occasional impacts or bumps. Additionally, the display should be easily visible in a variety of lighting conditions, to ensure that the user can always read the information being presented.

In an embodiment, the keyboard 104 further includes the memory 212. The keyboard 104 may require the memory 212 to store the data, software, and commands required by other components of the keyboard 104. The memory 212 is an essential component of the wearable keyboard 100. In general, the memory 212 refers to the hardware that stores data and instructions that the processor can access quickly. The keyboard 104 requires the memory 212 to store various kinds of information, such as the operating system, software applications, and user data. There are several types of memory that can be used, including volatile and non-volatile memory. Volatile memory, such as Random Access Memory (RAM), is used for storing temporary data that the processor 204 needs to access quickly. Non-volatile memory, such as flash memory, is used for storing data and instructions that need to be retained even when the power is turned OFF. In the wearable keyboard 100, the amount and type of memory required will depend on the specific design and intended use. For example, the wearable keyboard 100 that is designed for heavy data processing or multitasking may require more memory than a keyboard designed for basic text input. One example of memory that could be used in the wearable keyboard 100 is LPDDR4X RAM, which is a type of low-power, high-speed memory commonly used in mobile devices. This type of memory is designed to be energy-efficient and fast, which makes it a good choice for wearable devices with limited battery life. The functionality of the memory 212 is critical for the performance of the keyboard 104. A sufficient amount of memory is required to ensure that the keyboard 104 can perform its intended tasks efficiently. Additionally, the type of memory used can impact the energy efficiency and speed of the keyboard 104. Therefore, it is important to carefully select and optimize the memory 212 used in the wearable keyboards 100 to ensure optimal performance and battery life.

The wearable keyboard 100 further requires the communication module 214 to connect with the application devices. The communication module 214 may include wireless or wired communication technologies such as Bluetooth, Wi-Fi, NFC, or USB. This allows the keyboard 104 to transmit input signals to the application device and receive feedback or data from it.

Software

Commissioning process: The ability to connect the wearable keyboard 100 to eyeglasses is a feature that can enhance the portability and usability of the keyboard device. With this feature, the keyboard 104 may paired with the commissioning device such as the smartphone, laptop, AR or VR device, or other computing device by assignment of a device ID, user ID, network ID, or other ID which basically provides the keyboard and the associated computing device that they can communicate to each other and no other devices until additionally configured. The Keyboard can be projected onto the user's eyes, and the user can type on the keyboard 104 without the need for a physical touchpad or display, and the user can assign the keyboard type, set language, font, navigation and other keyboard settings and preferences. The configuration or settings are communicated and set with communication between the keyboard 100 and processor in thee computing device. One example of this technology is the use of augmented reality (AR) glasses, which can project a virtual keyboard onto the user's field of view. The glasses can use sensors and cameras to track the user's eye and hand movements, allowing them to interact with the virtual keyboard. Another example is the use of head-mounted displays (HMDs), which can also project a virtual keyboard onto the user's field of view. HMDs are often used in virtual reality (VR) applications, and they can provide a more immersive and interactive experience for the user. In both cases, the ability to connect the wearable keyboard 100 to these devices requires wireless connectivity, such as Bluetooth or Wi-Fi. The keyboard 104 may communicate with the eyeglasses or HMDs to enable the projection of the virtual keyboard. One of the main advantages of this feature is that it allows the user to type in a hands-free manner. This can be particularly useful in situations where the user needs to use their hands for other tasks, such as in a factory or warehouse setting, or when performing surgery or other medical procedures. Another advantage of this feature is that it can enhance the privacy of the user. With a virtual keyboard projected onto their eyes, the user can type without anyone else seeing the content they are typing. Overall, the ability to connect the wearable keyboard 100 to eyeglasses or HMDs can provide a more convenient, flexible, and immersive way of interacting with the device.

Calibration of key/cursor position processes: The wearable keyboard 100 described in the previous sections may be integrated with AR/VR devices to provide a new way of interacting with the digital world. In this context, one of the challenges is to provide a visual feedback of the keyboard 104 and the position of the cursor on the user's field of view, which can be achieved through projection on the eyes using the AR/VR device. To achieve this, the wearable keyboard 100 may be designed to have a specific key or location, such as the left bottom corner, that can be pressed in a specific manner to send a signal to the computing device. For example, the key can be pressed three times in a row within 2 seconds or held down for 5 seconds continuously. This signal can be used to inform the computing device of the position of the finger, which can be used to display the keyboard 104 and the cursor on the user's field of view. For instance, a user wearing an AR headset can press the specific key or location on the wearable keyboard 100 in the described manner to inform the computing device of the finger position. The computing device can then project a virtual keyboard and cursor on the user's field of view, synchronized with the user's finger movements. This way, the user can interact with the virtual world using the keyboard 104 and the cursor, without the need for physical keys or screens. This functionality expands the range of applications and use cases of the wearable keyboard 100, allowing for a more intuitive and efficient way of interacting with digital environments. The calibration can be automatic based on artificial intelligence and learning based on the pattern.

Figure 3:
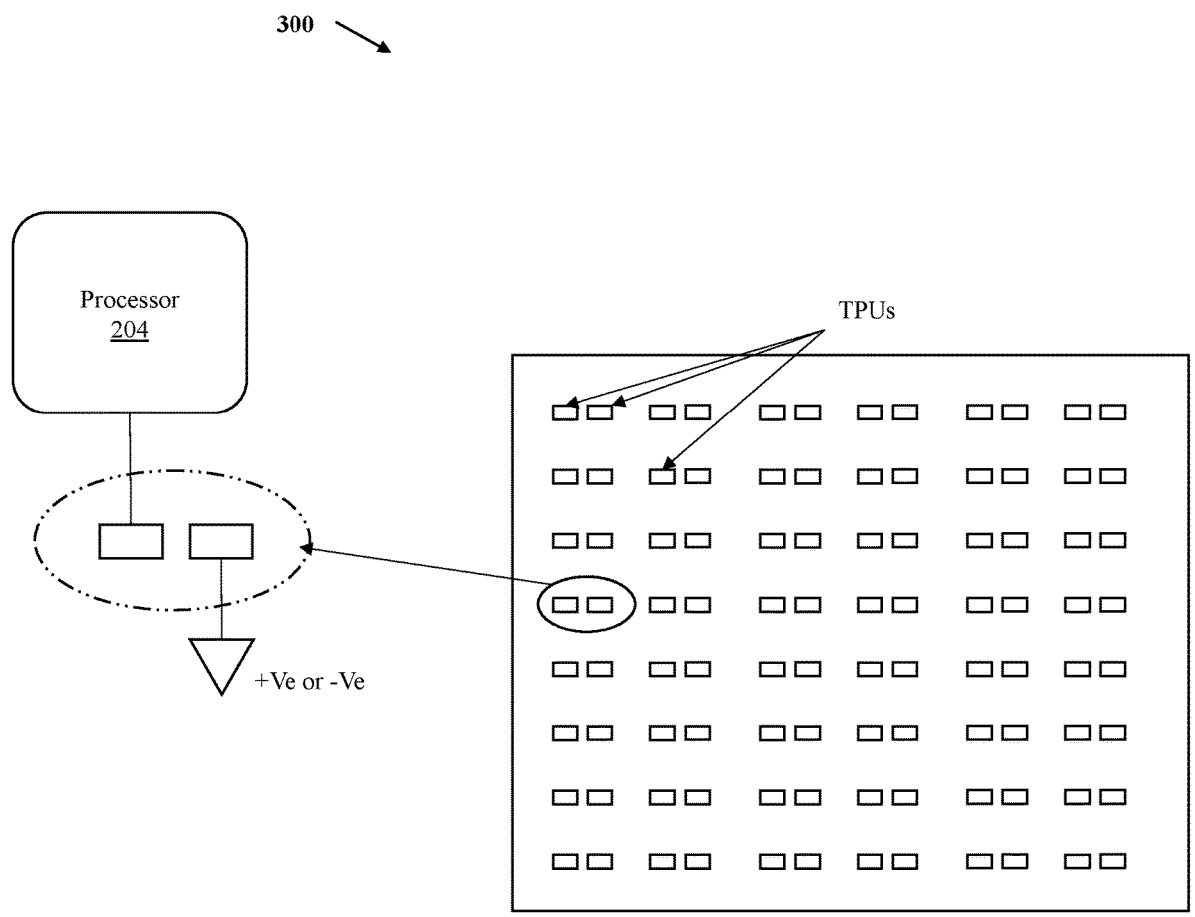
FIG. 3 is a block diagram that illustrates a touchpad of the wearable input device, in accordance with an exemplary embodiment of the disclosure.

FIG. 3 is a block diagram that illustrates the touch pad 300 of the wearable input device 100 of FIGS. 1a and 1b, in accordance with an exemplary embodiment of the disclosure. The touch pad 300 has been shown by numerals 118 in FIGS. 1b and 202 in FIG. 2. The touch pad 300 includes the plurality of touch pad units (TPUs). Each TPU includes at least one of one or more electrical parts or components including metal, electrical pad, electrical resistor, capacitor, inductor, diode, or transistor. The user wears a glove or a wearable with metal or other electrical part or a component in a form of a tip, which when placed between two adjacent TPUs, an electrical connection is completed, and the processor 204 may receive signals based on the completed electrical connection and execute one or more related operations.

In order to provide touch input, the touch pad 300 may be required. A standard keyboard with physical buttons could be used for this purpose, but it would not be efficient for typing with one or two fingers. A touch sensing keyboard is a better option, although it can consume more power, increasing battery requirements. To address this issue, a new type of touch pad 300 called a touch pad unit (TPU) has been disclosed herein. It consists of electrical components such as metal in the form of a pad, solder on the printed circuit board, electrical pad, electrical resistor, capacitor, inductor, diode, or mosfet on the board. One or more fingers can have a glove or wearable with metal or electrical parts or components on the tip, and when placed between two adjacent TPUs, the electrical connection will complete, and the processor 204 may receive signals such as electric interrupt. This touch pad 300 may have a protective layer, such as conformal coating, on some parts of the TPUs and the overall board. The board can also have a protective cover when not in use. In the event of water spillage, which can cause short circuits, protective measures can be taken. An electrical short circuit protection circuit may temporarily turn OFF the device, and the processor 204 may sense such signals and determine if it needs to shut down a part of the board to prevent electrical signals or shorts from affecting it. The processor 204 may also send a signal to the computing device to indicate a potential hazardous condition for the board and to take appropriate action. The disclosed touch pad 300 may be configured to provide features such as multi-touch gestures and customizable settings for sensitivity and cursor speed.

Figure 4A:
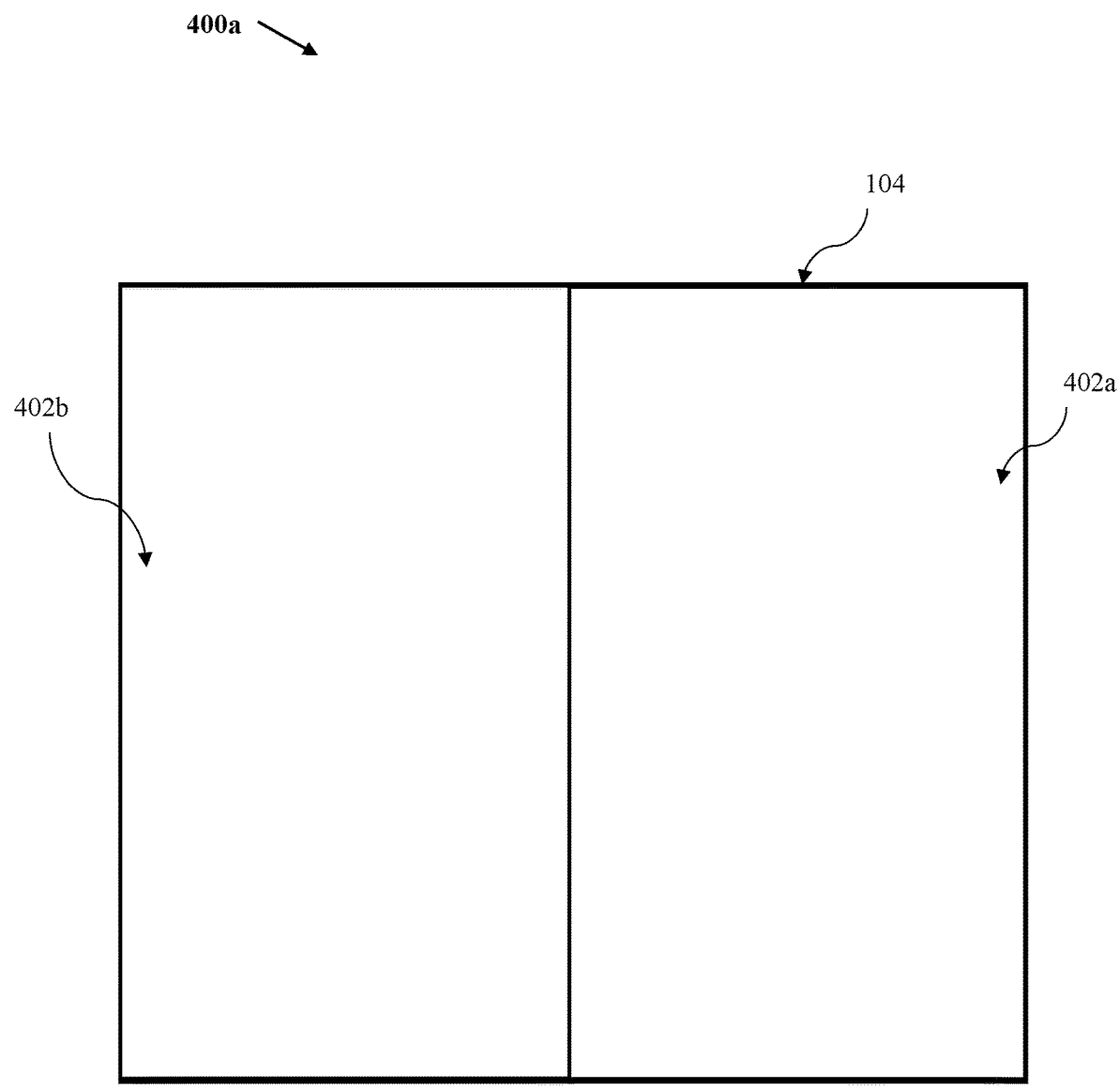
FIGS. 4a and 4b are block diagrams that illustrate a covering mechanism for the wearable input device, in accordance with an exemplary embodiment of the disclosure.
Figure 4B:
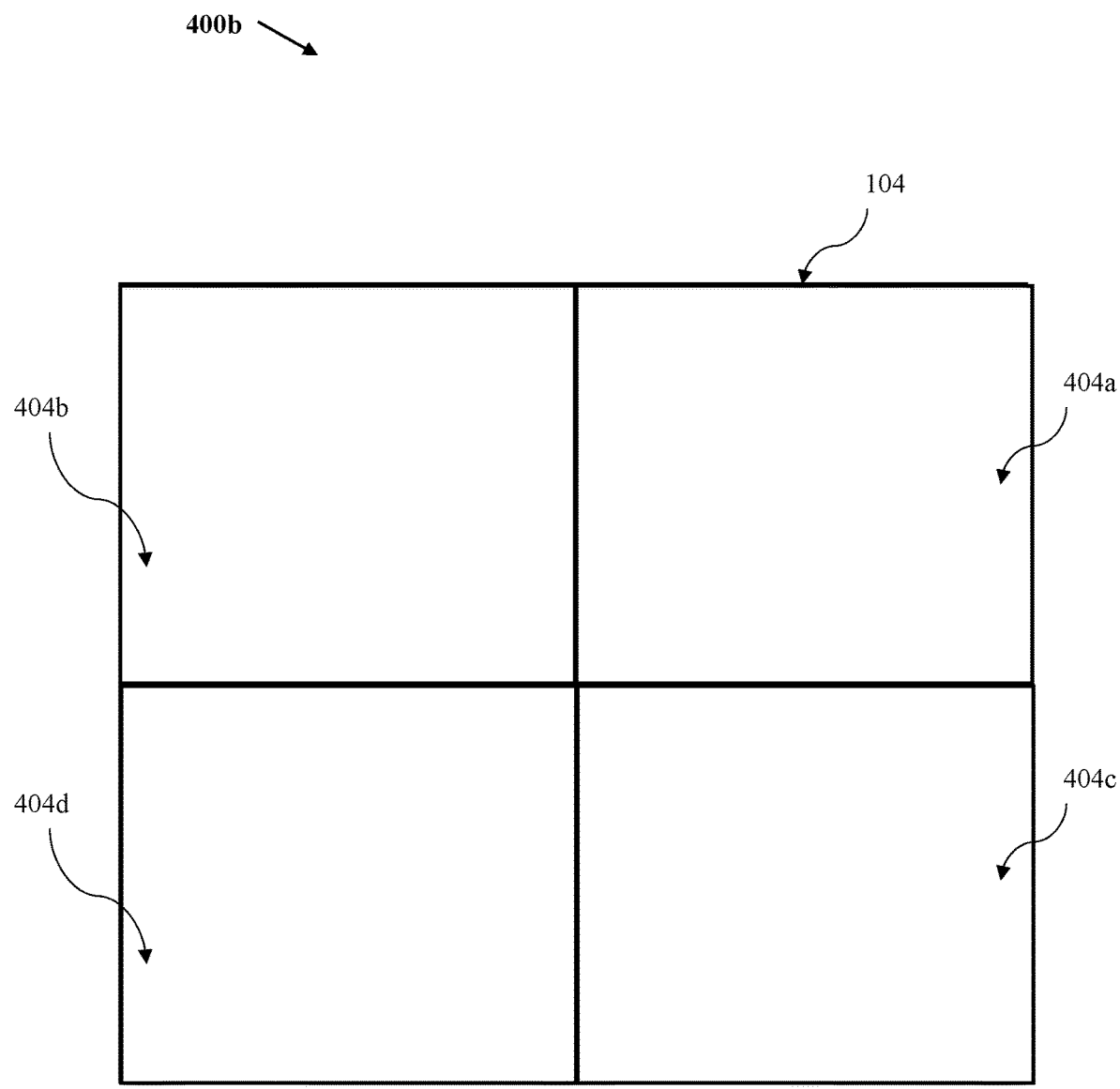

FIGS. 4a and 4b are block diagrams 400a and 400b that illustrate a covering mechanism for the wearable input device 100 of FIGS. 1a and 1b, in accordance with an exemplary embodiment of the disclosure. The wearable keyboard 100 may be designed with two covers 402a and 402b that can be closed from the top, providing protection for the keyboard 104 when it is not in use. These covers 402a and 402b may be attached to the keyboard 104 along a vertical line (or a horizontal line), with one edge of each cover rotatably attached to one edge of the keyboard 104. This means that the covers 402a and 402b can be easily opened or closed by rotating them around this attachment point. The use of two covers 402a and 402b may help to protect the keyboard 104 from dust, dirt, and other debris, as well as from accidental damage when it is not in use. When the covers 402a and 402b are closed, they can form a protective shell around the keyboard 104, which can help to ensure its longevity and reliability over time. The design of the covers 402a and 402b may vary depending on the specific needs of the application, and different materials may be used to provide the necessary strength, durability, and flexibility. For example, the covers 402a and 402b may be made from plastic, metal, or a combination of materials, and may be designed to be lightweight, easy to clean, and resistant to wear and tear. In addition to providing protection for the keyboard 104, the use of covers 402a and 402b may also make it easier to transport and store the wearable keyboard 100. By closing the covers, the keyboard 104 may be compacted into a smaller size, which can be more convenient for travel or storage. Overall, the use of covers 402a and 402b may provide a range of benefits for the wearable keyboard 100, helping to improve its durability, reliability, and convenience of use.

The covering aspect of the wearable keyboard 100 may also be achieved by using four covers 404a, 404b, 404c, and 402d instead of two. The four covers 404a, 404b, 404c, and 402d may open or close like four doors and can be configured in different ways. One possible configuration is to have two covers 404a and 404b on the top and two covers 404c and 404d on the bottom of the keyboard 104, where the covers 404a and 404b on the top can be opened independently from the covers 404c and 404d on the bottom. The covers 404a, 404b, 404c, and 402d may be attached to the keyboard 104 using a hinge mechanism, which allows them to open or close along a vertical line or a horizontal line, or any combination thereof. One edge of each cover may be rotatably attached to one edge of the keyboard 104, while the other edge can be secured using a locking mechanism. When closed, the covers 404a, 404b, 404c, and 402d may provide protection to the keyboard 104 and make it easier to carry. When opened, they can provide a larger typing surface and enable easier access to the touchpad and other components of the keyboard 104. The four-cover design can also provide additional flexibility in terms of customization and personalization. For example, different covers with different colors, materials, or patterns can be used to match the user's style or preferences. Additionally, the covers 404a, 404b, 404c, and 402d may be easily replaced or interchanged, allowing the user to switch between different cover designs or replace them in case of damage or wear.

In some embodiments, a retractable covering may be used for the keyboard 104. One way to implement this is to have a retractable cover that slides horizontally over the keyboard 104 when not in use. The cover can be made of a flexible material such as silicone or rubber that is thin and durable. When the user wants to use the keyboard 104, they can slide the cover back, which will expose the keys. Another way to implement a retractable cover is to have a cover that rolls up or down vertically. This could be similar to a window shade or a projection screen. When the keyboard 104 is not in use, the cover can be rolled down to protect the keys. When the user wants to type, they can roll the cover up, which will reveal the keys. The advantage of having a retractable cover is that it provides a convenient way to protect the keyboard 104 when not in use, which can help to prevent damage and extend the lifespan of the device. Additionally, a retractable cover can help to keep the keyboard 104 clean and free of dust and debris.

Figure 5A:
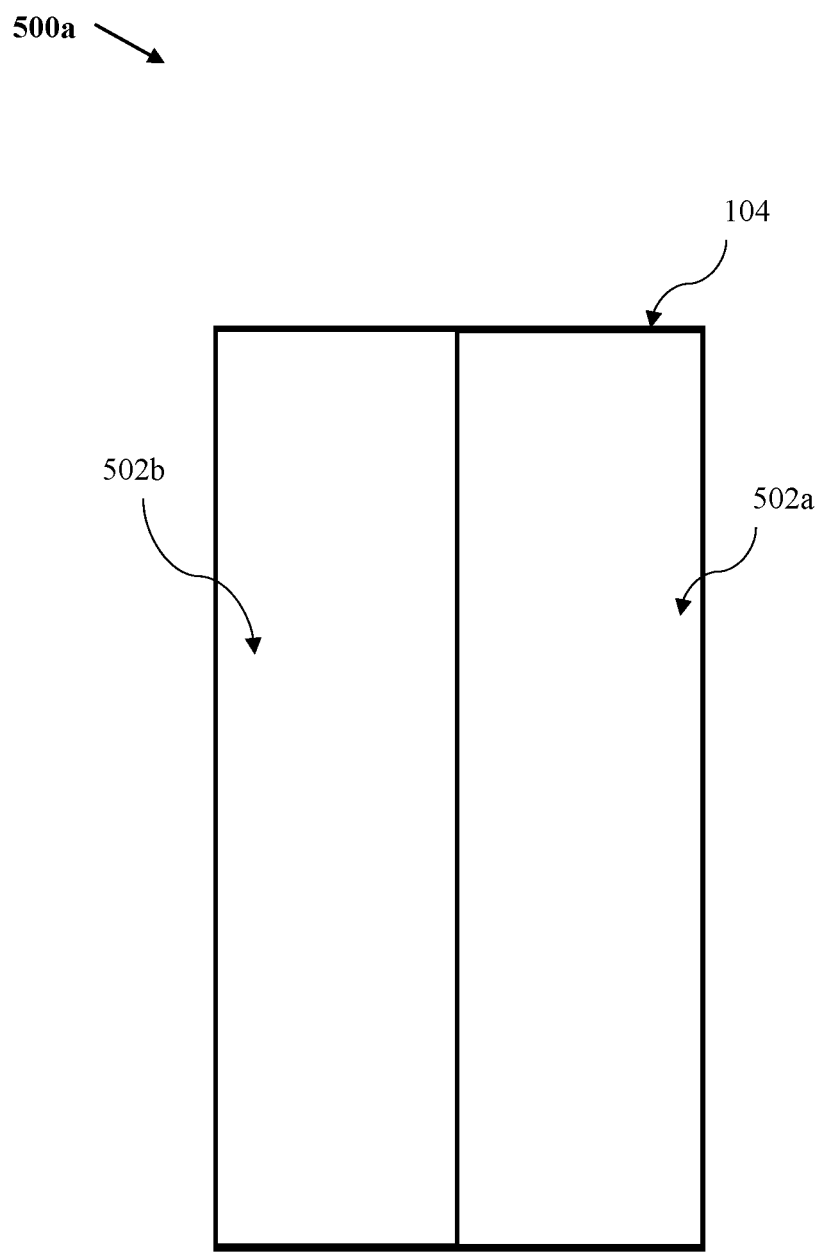
FIGS. 5a and 5b are block diagrams that illustrate a folding mechanism for the wearable input device, in accordance with an exemplary embodiment of the disclosure.
Figure 5B:
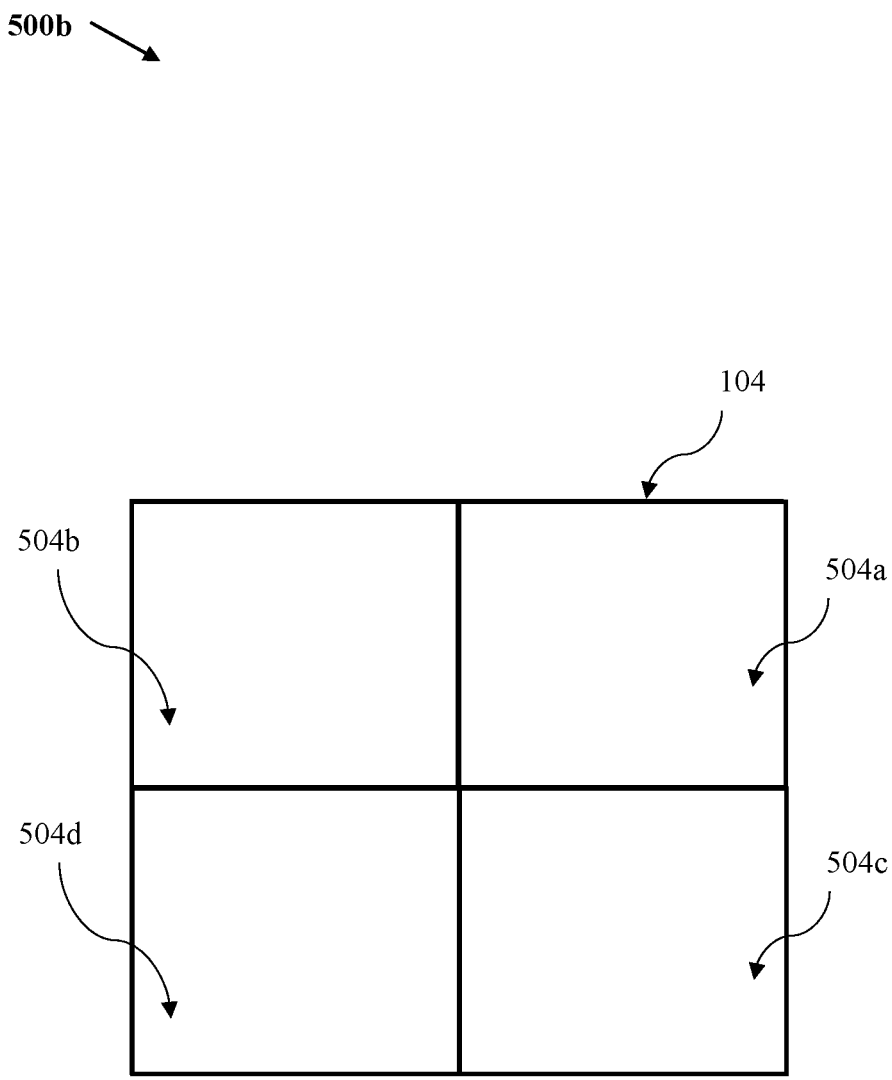

FIGS. 5a and 5b are block diagrams 500a and 500b that illustrate a folding mechanism for the wearable input device 100 of FIGS. 1a and 1b, in accordance with an exemplary embodiment of the disclosure. The wearable keyboard 100 may also be designed to have a covering using the folding of the keyboard 104 itself. In this case, the keyboard 104 may be designed to be foldable once along a vertical or horizontal line, so that when the keyboard 104 is not in use, it can be folded in such a way that it covers itself, providing protection against dust, moisture, or physical damage. For example, the keyboard 104 may be designed to have a flexible and durable material that allows for easy folding without affecting its functionality. The folding line can be reinforced with a sturdy hinge mechanism, such as a flexible printed circuit board or a flexible metal hinge, that can withstand repeated folding and unfolding. When the keyboard 104 is folded, the keys and other components are covered and protected by the outer surfaces 502a and 502b of the folded keyboard. The folding design can also allow for the keyboard 104 to be made more compact and portable, making it easier to carry around and store when not in use. In addition, the folding design can also provide other benefits such as ergonomics and ease of use. For example, the keyboard 104 may be designed to have a split layout when folded along a vertical line, allowing for a more natural typing posture and reducing strain on the hands and wrists. Alternatively, the keyboard 104 may be designed to have a compact size and a simplified layout when folded along a horizontal line, making it easier to type with one hand or in limited spaces. Overall, the folding design for the wearable keyboard 100 may provide a practical and versatile solution for protecting the keyboard 104 and enhancing its functionality and portability. In some embodiments, the keyboard 104 may be folded twice, either along a vertical or horizontal line. This would create a more compact and portable device. The user could fold the keyboard 104 along the first line to reduce its length or width, and then fold it again along the other line to make it even smaller. For example, a keyboard with a length of 10 inches and width of 5 inches could be folded to a length of 5 inches and width of 2.5 inches with a single fold, or to a length of 2.5 inches and width of 2.5 inches with two folds. This would make the keyboard 104 easier to carry and store and could be useful for users who need to travel frequently or have limited workspace. However, care would need to be taken to ensure that the keyboard 104 can still function effectively when folded, and that the folding mechanism does not put undue strain on the keyboard components.

In the case of the keyboard 104 folding using 4 folding, the keyboard 104 may be folded twice along a horizontal line and twice along a vertical line, as shown by back covers 504a, 504b, 504c, and 504d of the keyboard 104. This allows the keyboard 104 to be compactly folded into a smaller form factor when not in use, making it easier to carry and store. When using the keyboard 104, the user can unfold it into its full size by carefully unfolding each section one by one until the entire keyboard is flat and ready for use. The four-fold design allows for greater flexibility in how the keyboard 104 may be arranged and used, as the user can adjust the position of the keyboard 104 to suit their needs. The keyboard can be foldable like a paper as a paper display is foldable.

Figure 6A:
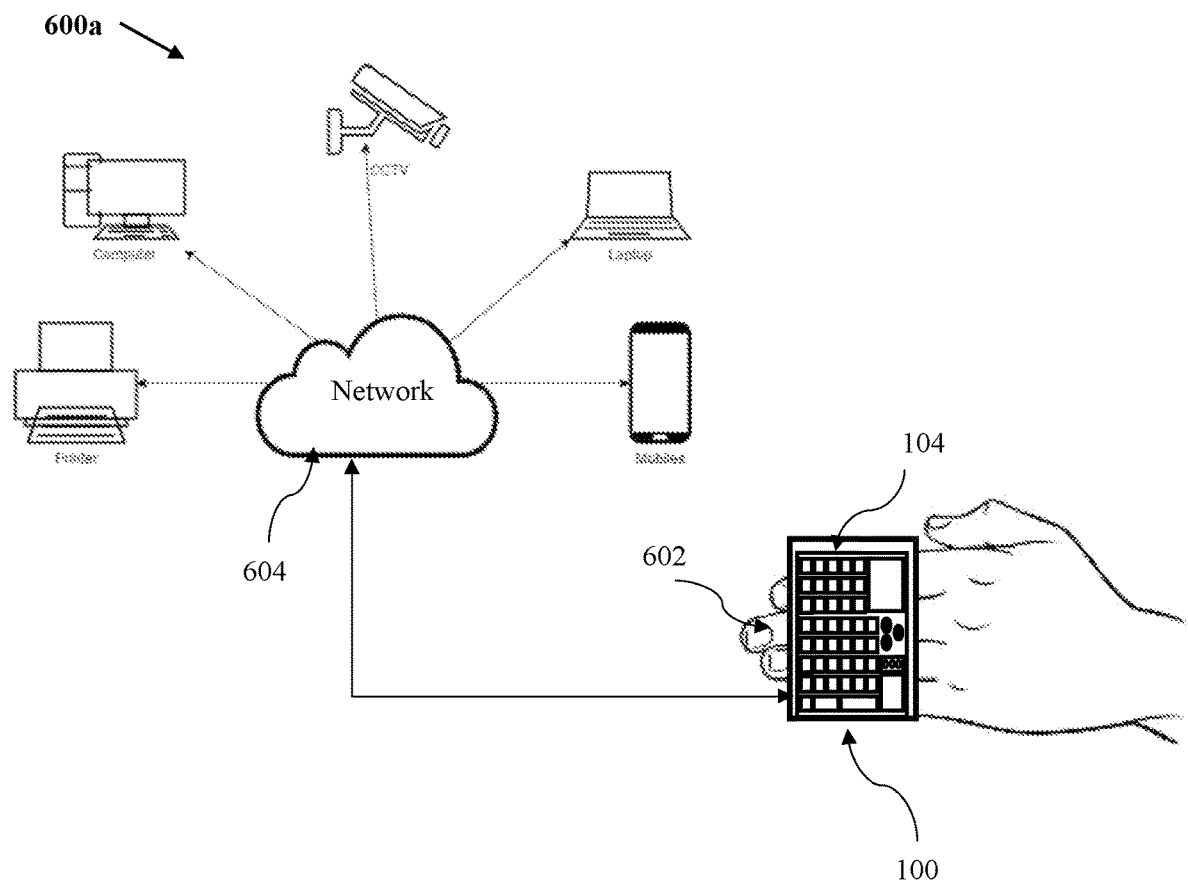
FIGS. 6a, 6b, 6c, 6d and 6e are diagrams that illustrate a user wearing the wearable input device on a finger, in accordance with an exemplary embodiment of the disclosure.
Figure 6B:
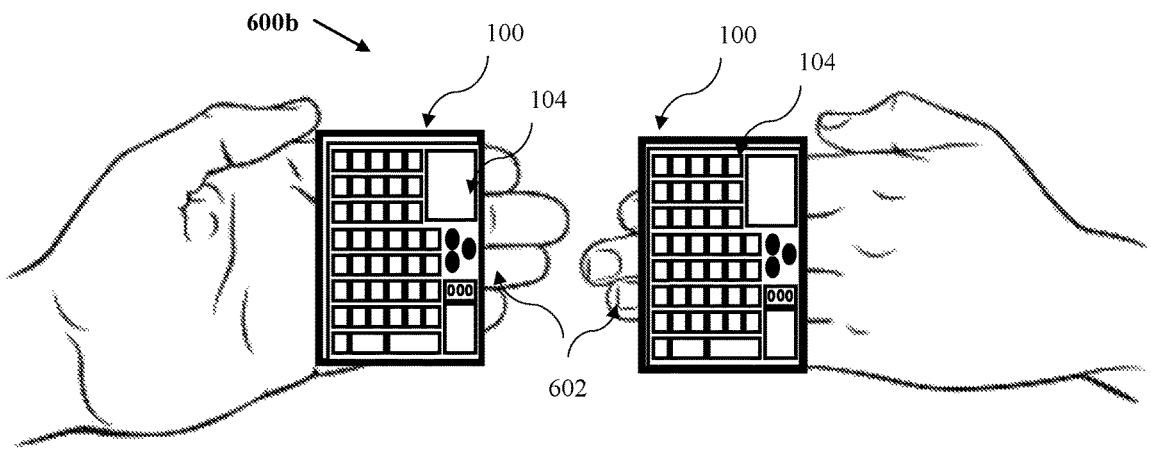
Figure 6C:
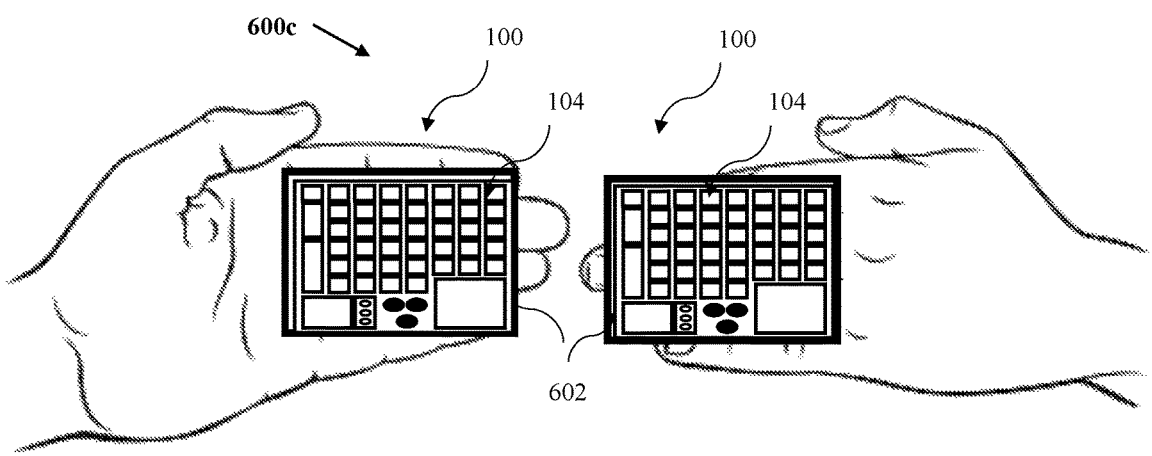

FIGS. 6a, 6b, 6c, 6d, and 6e are diagrams 600a, 600b, 600c, 600d, and 600e that illustrate a user wearing the wearable input device 100 of FIGS. 1a and 1b, in accordance with various exemplary embodiments of the disclosure. As shown in FIGS. 6a, 6b, 6c, 6d, and 6e, the wearable input device 100 has been worn on finger(s) 602 by the user. The wearable input device 100 may be worn on either side of the palm of the user's hand. Further, the wearable input device 100 may be worn on a single finger 602 by using the single ring 102 to which the keyboard 104 is attached to form the wearable input device 100 (explicitly shown in FIG. 6d) or may be worn on multiple fingers by using multiple rings 102a, 102b, 102c, and 102d to which the keyboard 104 is attached to form the wearable input device 100 (explicitly shown in FIG. 6e). In FIGS. 6b and 6c, the wearable input device 100 has been shown on both sides of the user's hand. The keyboard 104 of the wearable input device 100 may be rotated around the ring axis so that the user can adjust the keyboard 104 on his palm or on hand's backside according to his/her convenience of using the keyboard 104. For example, in FIG. 6b, the keyboard 104 of the wearable input device 100 has been rotated to keep it in a vertical plane. Similarly, in FIG. 6c, the keyboard 104 of the wearable input device 100 has been rotated to keep it in a horizontal plane.

Figure 6D:
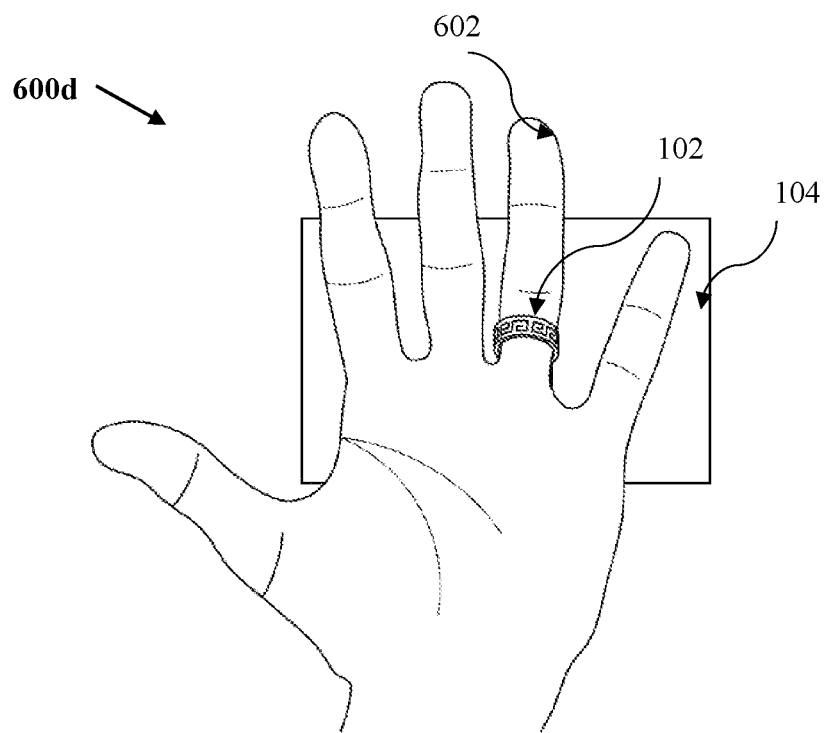
Figure 6E:
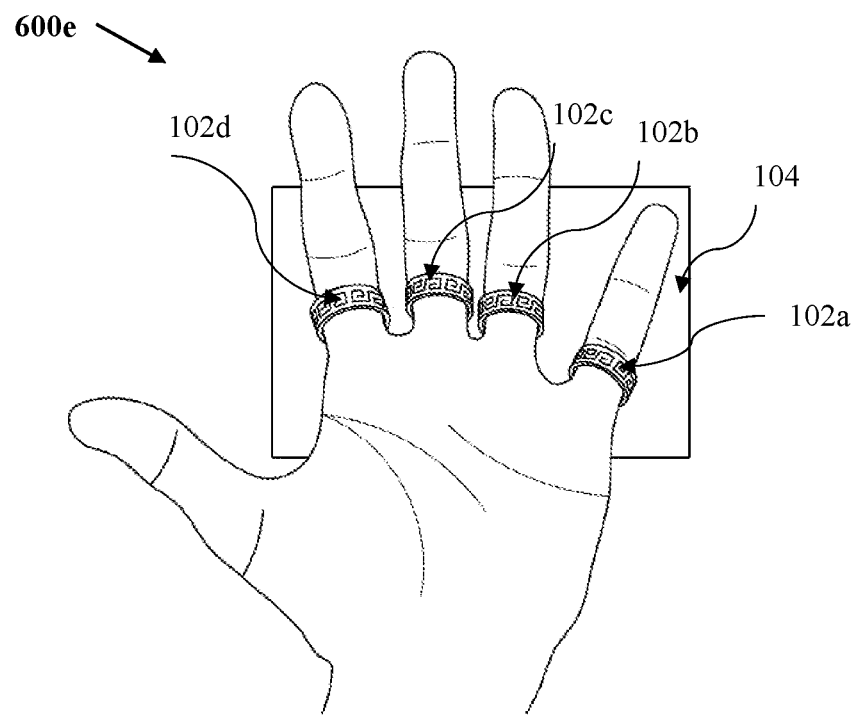

In the wearing process where the wearable keyboard 100 is worn by the user on the finger 602, the user first inserts their finger 602 into the ring 102 (as shown in FIG. 6d) attached on the backside of the keyboard 104. In case of multiple rings, the user may insert multiple fingers into the multiple rings 102a, 102b, 102c, and 102d (as shown in FIG. 6e) that are attached on the backside of the keyboard 104. The ring 102 (the rings 102a, 102b, 102c, and 102d) may be designed to fit snugly on the user's finger(s), ensuring that the keyboard 104 remains securely in place during use. Once the ring 102 is fitted on the user's finger(s) 602, the user can activate the keyboard 104 and begin typing. The touchpad and sensors on the keyboard 104 are designed to detect the user's finger movements and convert them into corresponding keystrokes or commands, allowing the user to interact with an external device such as a mobile, a laptop, a computer, a printer, or the like. The finger-worn design of the wearable keyboard 100 offers several benefits, including portability, convenience, and ease of use. Users can carry the wearable keyboard 100 with them wherever they go, and can quickly and easily type out messages or commands using just one hand. Additionally, the finger-worn design allows for a more natural and intuitive typing experience, as users can use their finger to type in a manner that closely mimics the way they would write with a pen or pencil.

To connect the wearable keyboard 100 with the external device(s) such as a mobile, a laptop, a computer, a printer, or the like, the user can use one of the following mechanisms to connect with the external device(s) over a network 604:

Bluetooth connection: The wearable keyboard 100 may be equipped with Bluetooth technology, which allows the user to connect it to any device that supports Bluetooth, such as a mobile phone, laptop, or computer. The user can pair the keyboard 104 with the external device by turning on the Bluetooth function on both devices and searching for nearby devices to connect.

USB connection: The wearable keyboard 100 may also be connected to an external device using a USB cable. The keyboard 104 can be equipped with a USB port, and the user can connect it to the device's USB port using a cable. This method is useful for connecting the keyboard 104 to the external devices that do not have Bluetooth or when the Bluetooth is not available.

Wireless connection: The wearable keyboard 100 may also use other wireless technologies, such as Wi-Fi or NFC, to connect to devices that support these technologies.

The purpose of connecting the wearable keyboard 100 to the external device(s) is to use it as an input device. For example, the user can wear the wearable keyboard 100 on the user's finger 602 and connect the keyboard 104 to a mobile phone or a computer and use it to type text or commands. The user can also connect the keyboard 104 to a printer or a CCTV system to control it using the keyboard 104. In the case of an AR/VR device, the keyboard 104 can be used to input commands and navigate through the virtual environment.

Figure 7A:
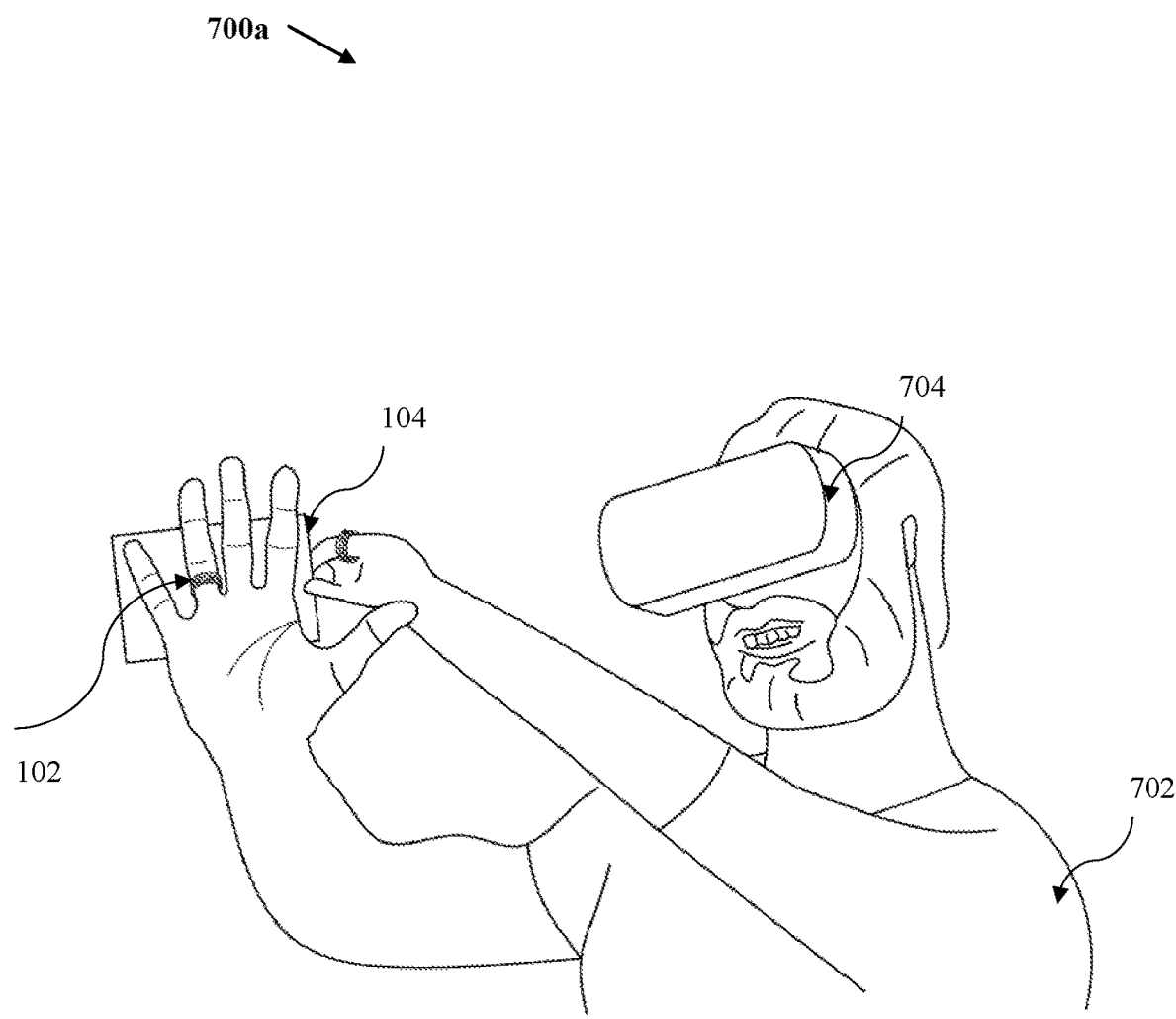
FIGS. 7a, 7b, and 7c are diagrams that illustrate a user wearing the wearable input device and AR/VR device, in accordance with an exemplary embodiment of the disclosure.
Figure 7B:
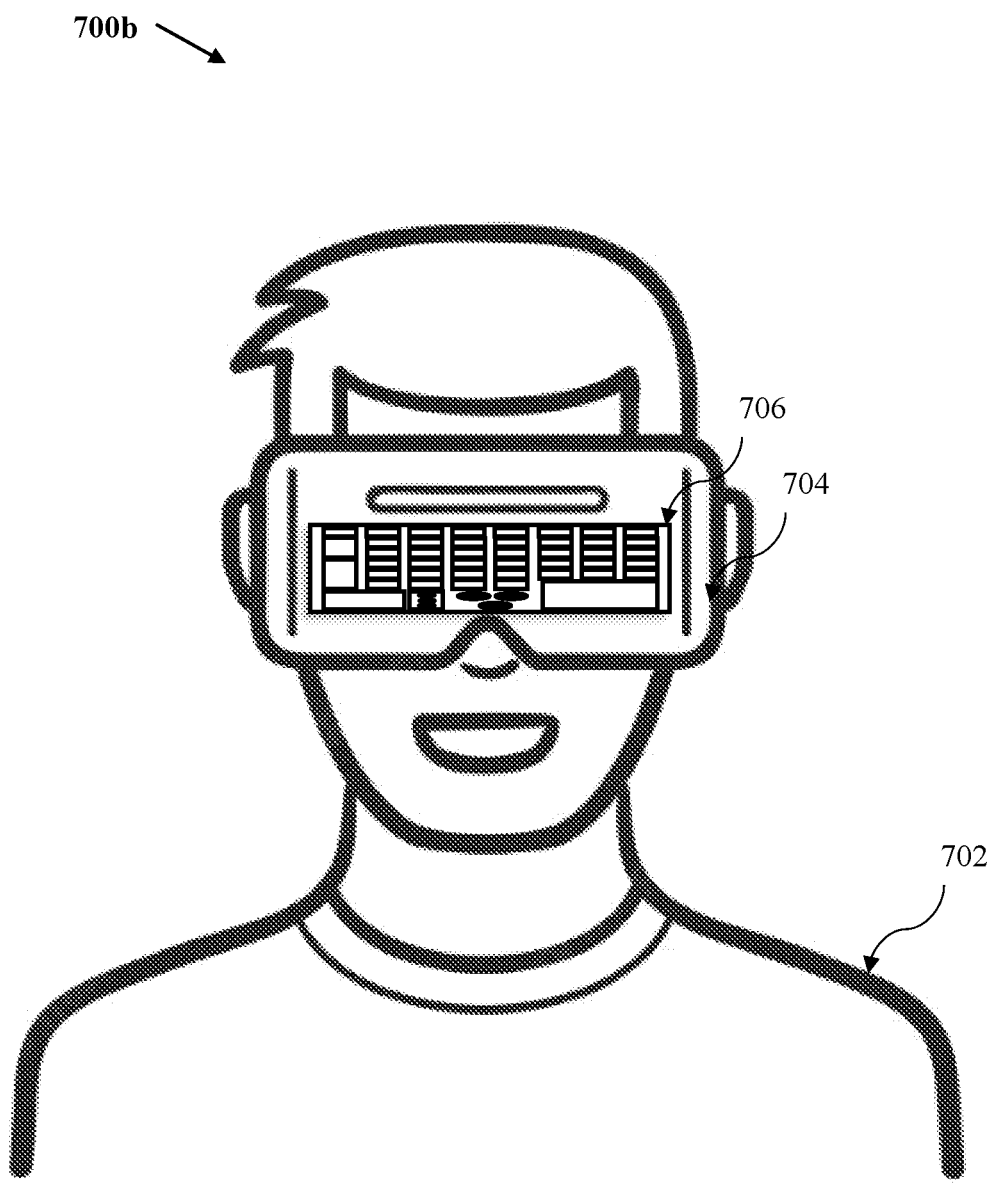
Figure 7C:
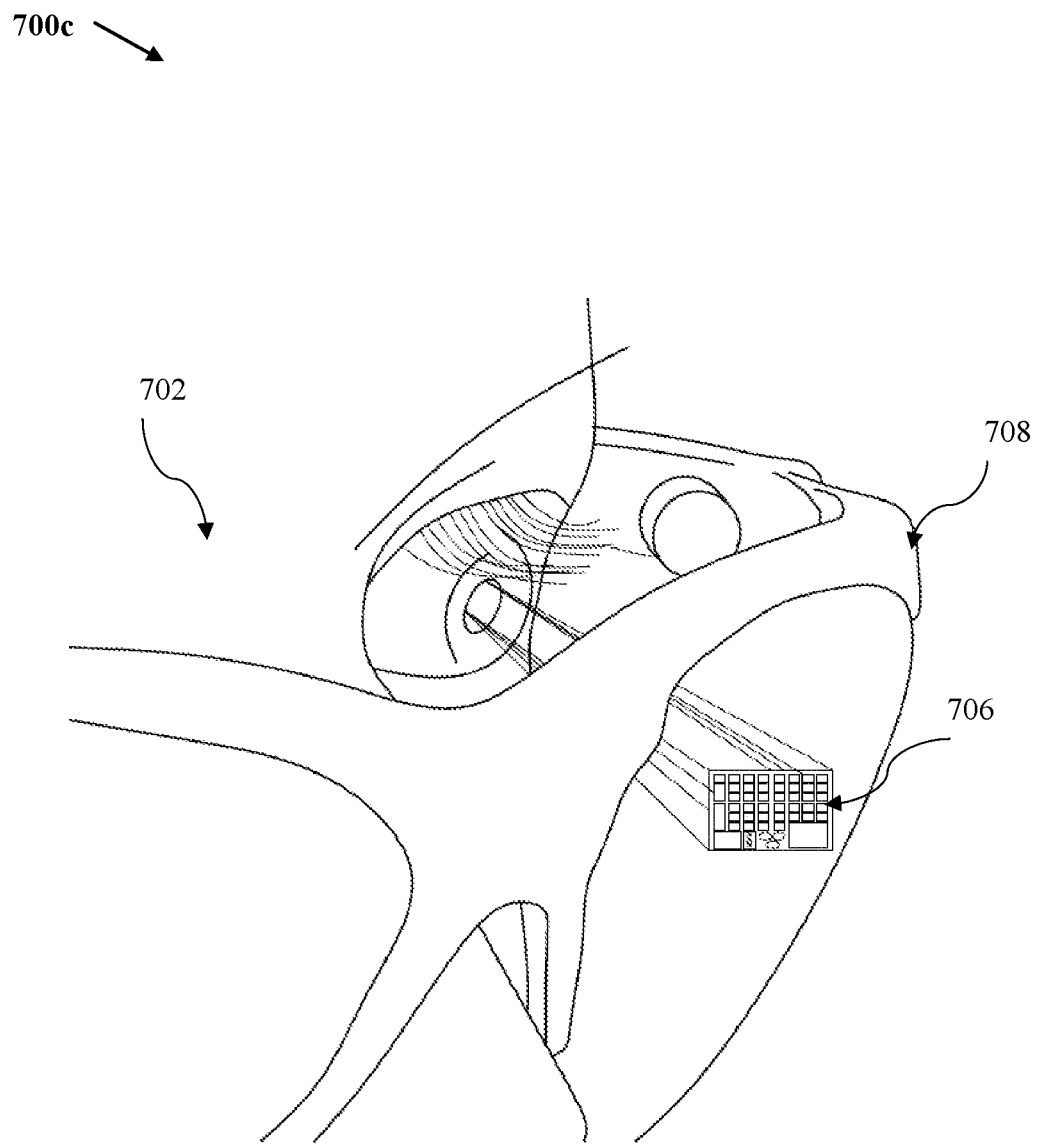

FIG. 7a is a diagram 700a that illustrates a user 702 wearing an AR/VR device 704. The user 702 is further wearing the keyboard 104 by means of the ring 102 attached to the keyboard 104. The user 702 is operating the keyboard 104 by using other hand. As shown in FIG. 7b, the AR/VR device 704 further displays a projection of a digital keyboard on its display. The wearable keyboard 100 is a small, portable device that can be attached to the user's finger or worn as a ring. It includes a projection capability that projects an image of a simulated keyboard onto a surface, such as a projection screen or the display of the AR/VR device 704. To use the wearable keyboard 100 with the AR/VR device 704, the user 702 may activate or turn on the keyboard 104 of the wearable input device 100. This would trigger the projection of the simulated keyboard onto the display of the AR/VR device 704. The user 702 can then interact with the keyboard 104 by tapping on the surface of the display, and the AR/VR device would register the user's input and transmit it to the connected device, such as a smartphone, computer, or tablet. This is possible by using sensors and microcontrollers to detect the user's finger movements and translate them into input commands. The keyboard 104 may include gesture sensors or other types of sensors to detect finger movements, and the AR/VR device 704 could include motion sensors and touch sensors to detect the user's input. The keyboard 104 could also be connected to the AR/VR device 704 via Bluetooth or another wireless communication protocol, which would enable the two devices to communicate and transmit data between each other. The concept of using the wearable keyboard 100 with an AR/VR device provides a convenient and intuitive input mechanism for users, enabling them to interact with their devices in a more natural and immersive way. Further, in FIG. 7c, the user 702 is wearing an AR/VR glass (i.e., a smart glass) over their eyes. The wearable keyboard 100 can be connected to the smart glass 708 via wireless communication technology such as Bluetooth or Wi-Fi. Once connected, the wearable keyboard 100 may project a virtual keyboard on the display of the smart glass 708, and the user 702 may interact with the keyboard 104 by tapping their fingers on the keyboard 104. In this scenario, the wearable keyboard 100 can be designed to detect finger gestures or taps, which are then transmitted wirelessly to the smart glass 708 for processing. The smart glass 708 may then interpret these gestures and display the corresponding characters on the virtual keyboard, allowing the user 702 to type and interact with the device without physically touching the keyboard 104. The advantage of using the smart glass 708 in this scenario is that the user can interact with the wearable keyboard 100 and the virtual keyboard 706 while still being able to see their surroundings. This can be particularly useful in situations where the user needs to be aware of their surroundings while typing, such as when walking or working in a busy environment. Additionally, the use of a smart glass 708 can eliminate the need for a separate display or projection surface, making the system more compact and portable.

Figure 8:
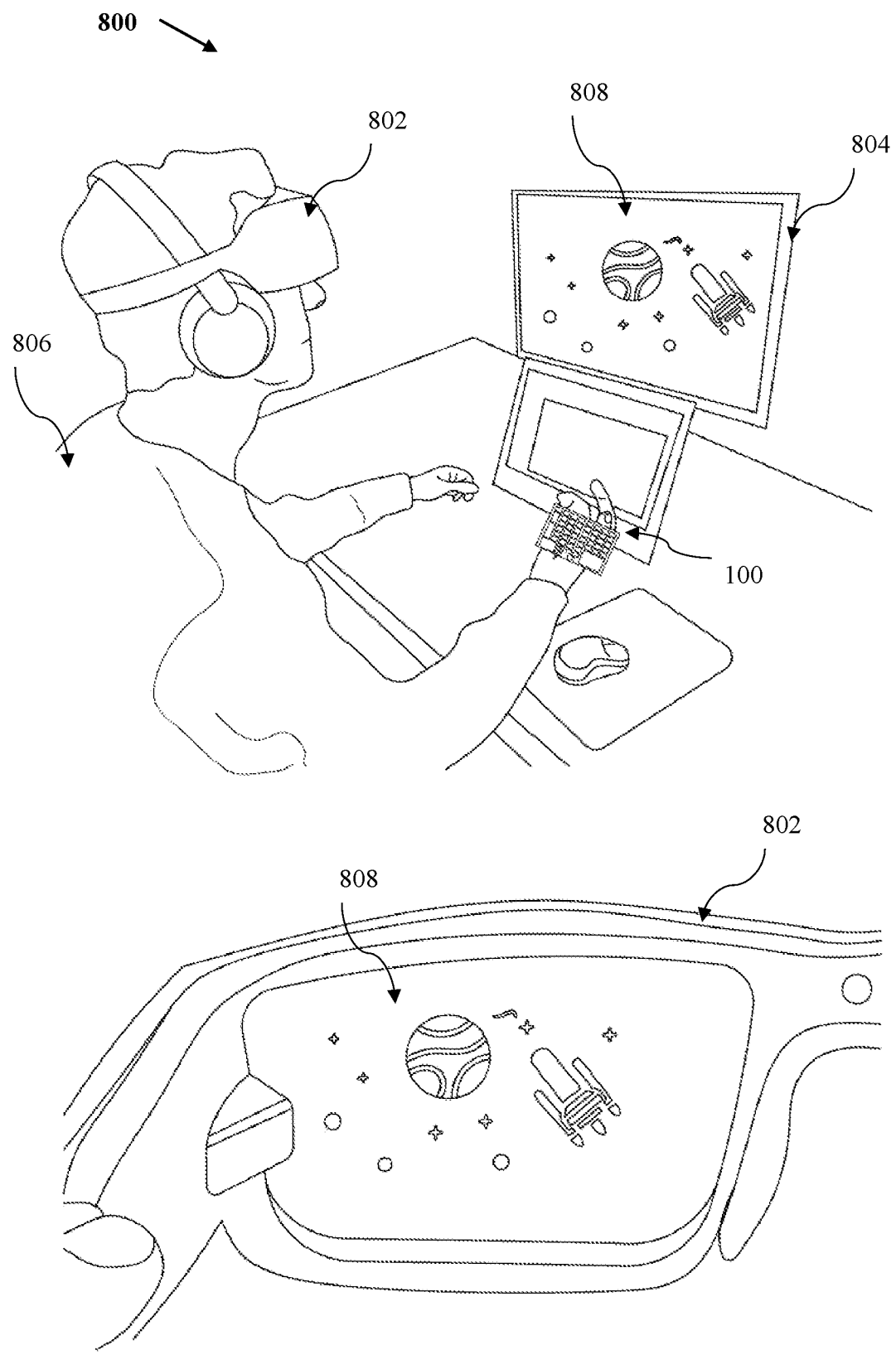
FIG. 8 is a diagram that illustrates user interaction with multiple devices for creating and editing an image, in accordance with an exemplary embodiment of the disclosure.

FIG. 8 is a diagram 800 that illustrates user interaction with multiple devices such as the wearable keyboard 100, the AR/VR device 802, and a computer 804. In this scenario, the user 806 is interacting with multiple electronic devices simultaneously to create and edit an image 808. The user 806 has a wearable keyboard 100 on one of their fingers, the AR/VR device 802 on their head, and the computer 804 in front of them. The computer 804 is showing the image 808 that the user 806 is drawing on it. This image 808 is also presented on the AR/VR device 802 for the user 806 wearing it. Using the wearable keyboard 100, the user 806 can navigate through different editing tools and features available on the computer 804 or on the keyboard 104 itself. For example, they can select a color or a brush size using the wearable keyboard 100, and then draw on the computer screen using their hand or a stylus. The AR/VR device 802 can provide a 3D visualization of the image 808 being drawn, allowing the user 806 to see it from different angles and perspectives. The wearable keyboard 100 can also be used to zoom in and out of the image 808, move it around on the computer screen, or access different editing tools such as eraser or undo. The user 806 can use natural gestures and movements to control the image 808, making the editing process more intuitive and efficient. For example, the user 806 can draw a line using the stylus, then use the wearable keyboard 100 to zoom in on a specific section of the line, and then use the stylus again to add more details. The AR/VR device 802 can show a magnified view of the section being edited, allowing the user 806 to see the details more clearly. Overall, this setup provides a seamless and intuitive way for the user 806 to create and edit images using a combination of natural hand gestures, wearable keyboard input, and AR/VR visualization.

Figure 9:
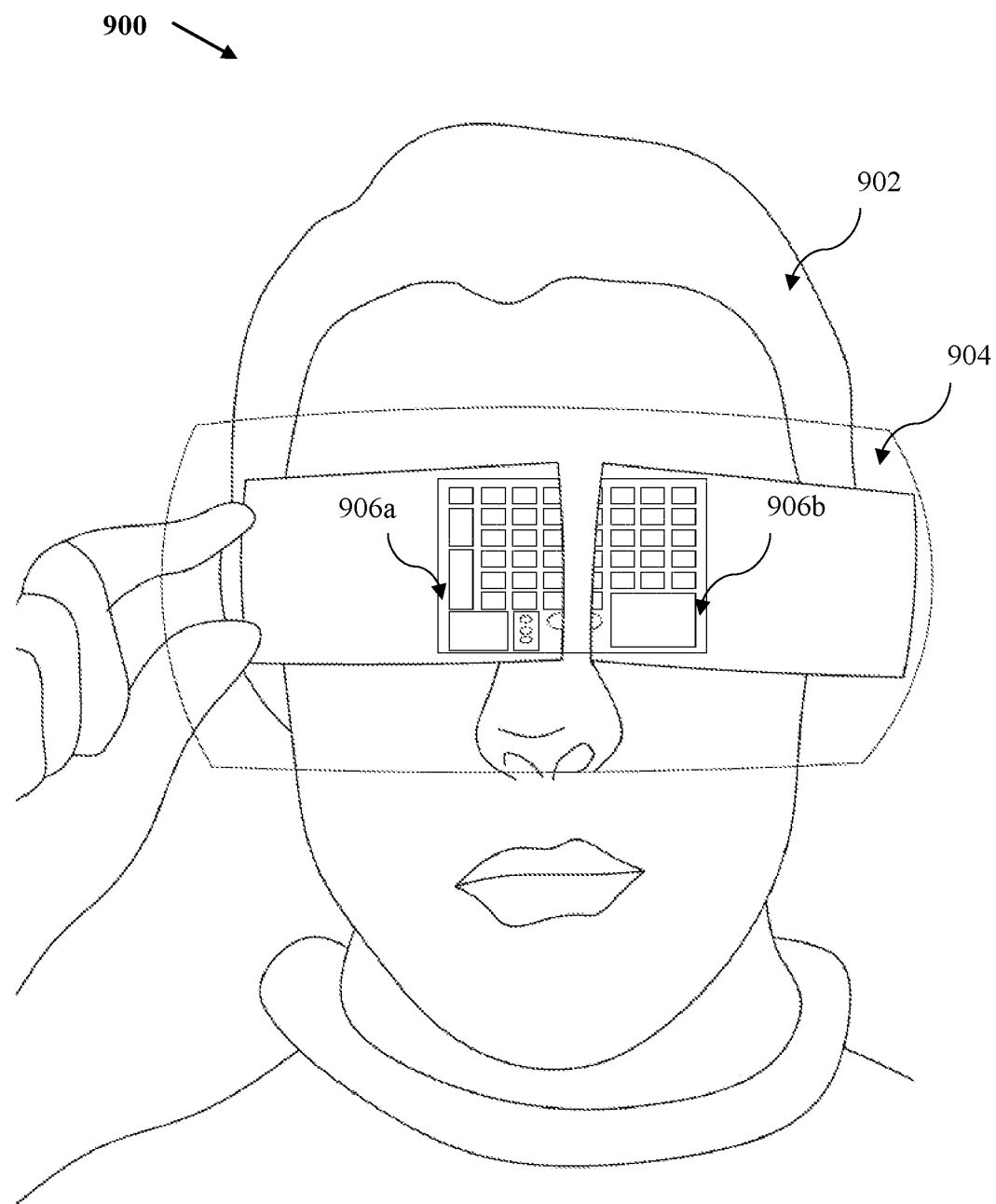
FIG. 9 is a diagram that illustrates a split keyboard projection on a smart glass, in accordance with an exemplary embodiment of the disclosure.

FIG. 9 is a diagram 900 that illustrates a split keyboard projection on a smart glass 904 worn by a user 902, in accordance with an exemplary embodiment of the present disclosure. This involves projecting a virtual keyboard onto the smart glass 904 worn by the user 902. The virtual keyboard is split into two halves and each half is projected onto a separate portion of the smart glass 904. This allows the user 902 to type on the virtual keyboard by touching the corresponding portion of the smart glass 904. For example, the left half of the virtual keyboard 906a can be projected onto the left portion of the smart glass 904, and the right half of the virtual keyboard 906b can be projected onto the right portion of the smart glass 904. The user 902 can then type on the left half of the keyboard 104 by touching the left portion of the smart glass 904, and type on the right half of the keyboard 104 by touching the right portion of the smart glass 904. The split keyboard projection can be achieved by using a software algorithm that divides the virtual keyboard image into two halves and projects each half onto a corresponding portion of the smart glass 904. The smart glass 904 can have touch sensors or other sensors to detect the user's touch and transmit the input to a connected device.

The concept of splitting the virtual keyboard projection into two halves can be achieved by using a technique called "stereoscopic projection" or "stereoscopic display". In this technique, two separate images are projected on two different screens, each seen by one eye of the user 902. When the brain combines these two separate images, it creates a 3D illusion. In the case of the wearable keyboard 100, the projection of the keyboard 104 can be split into two halves by projecting one half of the keyboard 104 on the left side of the smart glass 904 and the other half on the right side. The user 902 can see both halves of the keyboard 104 in 3D and can type using the wearable keyboard 100 with both hands. For example, suppose the user 902 is wearing a smart glass 904 that has two separate screens, one for the left eye and one for the right eye. The wearable keyboard 100 can be programmed to project the left half of the keyboard 104 on the left screen and the right half of the keyboard 104 on the right screen. The user 902 can see both halves of the keyboard 104 in 3D and can type using both hands on the wearable keyboard 100. Alternatively, the wearable keyboard 100 can also be programmed to split the keyboard projection into two halves using a single screen by using a technique called "side-by-side" projection. In this technique, the two halves of the keyboard projection are placed side by side on the same screen, and the user wears the smart glass that separates the image into two halves, one for each eye.

This split keyboard projection can provide a more ergonomic typing experience for the user, as it allows them to type with their hands in a more natural position rather than reaching across a full-sized virtual keyboard. It can also be useful for tasks that require the user to simultaneously interact with two separate devices, such as typing on a computer while referencing information on an AR/VR device.

Figure 10:
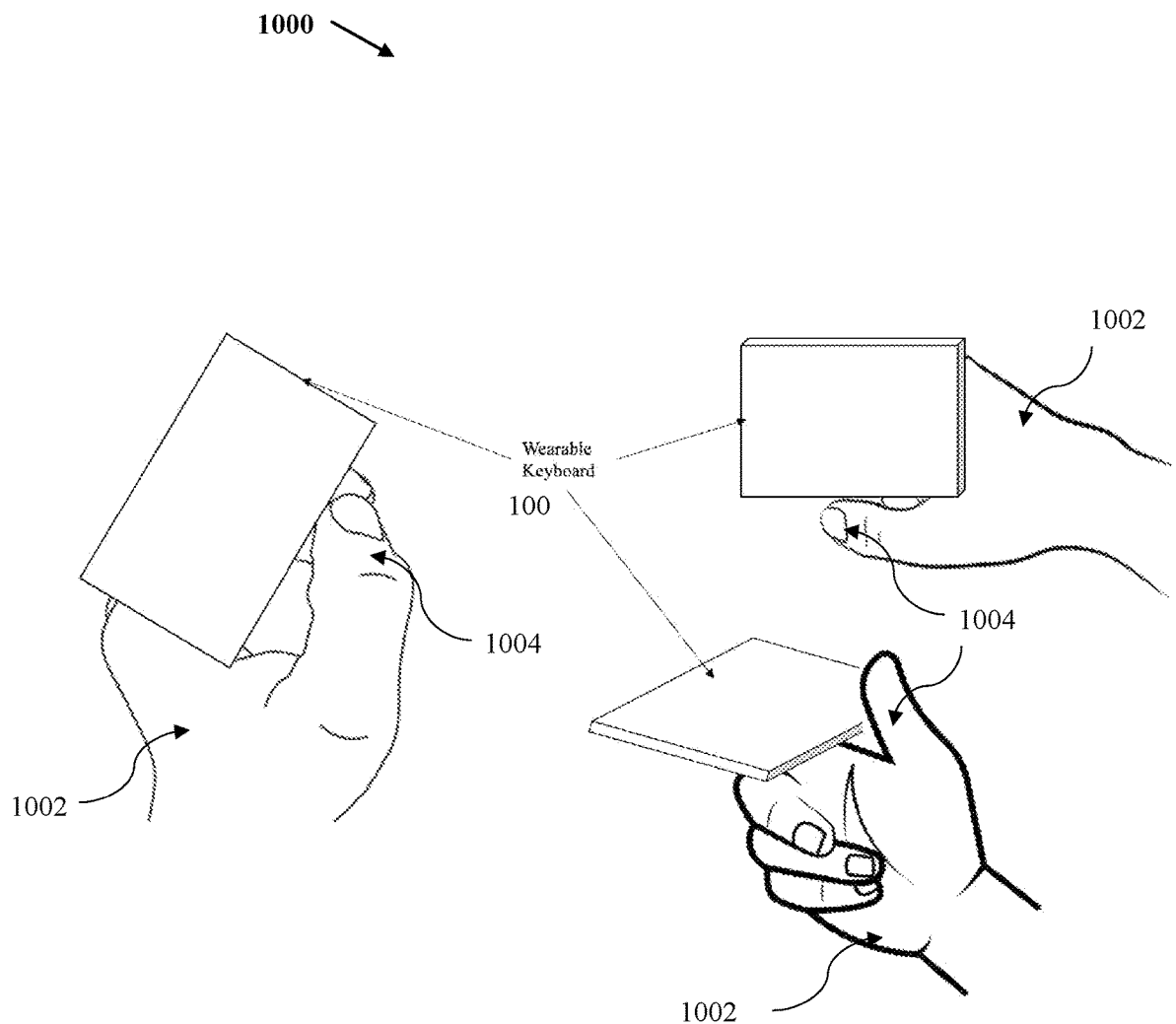
FIG. 10 is a diagram that illustrates the wearable input device worn on a user's hand, in accordance with an exemplary embodiment of the present disclosure.

FIG. 10 is a diagram 1000 that illustrates the wearable keyboard 100 worn on a user's hand 1002, in accordance with an exemplary embodiment of the present disclosure. The concept of the wearable keyboard 100 that can be rotated around the ring's axis is to allow the user to adjust the keyboard's position to a more comfortable angle while typing or using the keyboard 104 of the wearable keyboard 100. The wearable keyboard 100 is designed to fit onto the user's index finger and is secured in place with the ring 102 of the wearable keyboard 100 that can be adjusted to fit the finger's size. The ring 102 is then rotated around the axis of the index finger, allowing the user to position the keyboard 104 in a way that is comfortable for them. The rotation feature is particularly useful for people who use the keyboard 104 for extended periods, as it reduces the strain on their hands and wrists. For example, if the user wants to type using only one hand, they can rotate the keyboard 104 to the side where their thumb 1004 can reach all the keys, making it easier to type. Additionally, the user can also adjust the angle of the keyboard 104 to accommodate different typing positions, such as typing on a table, in their lap, or while standing. The rotation feature of the wearable keyboard 100 can be implemented using various mechanical designs. For example, the ring 102 may include a hinge that allows it to pivot around the index finger's axis, or the keyboard 104 itself may be designed to swivel on the ring' mount. The rotation mechanism must be robust enough to hold the keyboard 104 in place during use, but also allow for easy adjustments as needed. The thumb 1004 can be used for various operations on the wearable keyboard 100. Some of the operations include rotating the keyboard 104 around the axis of the ring 102 to adjust its position for comfortable typing, pressing the keys, and using the touchpad or gesture sensors for navigation. The thumb 1004 can also be used for activating special functions such as copy-paste, volume control, or media playback control. Additionally, the thumb 1004 can be used for switching between different modes of the keyboard 104, such as switching between alphabets, numbers, or symbols. With the help of the thumb 1004, the user can operate the wearable keyboard 100 with ease and efficiency.

Figure 11:
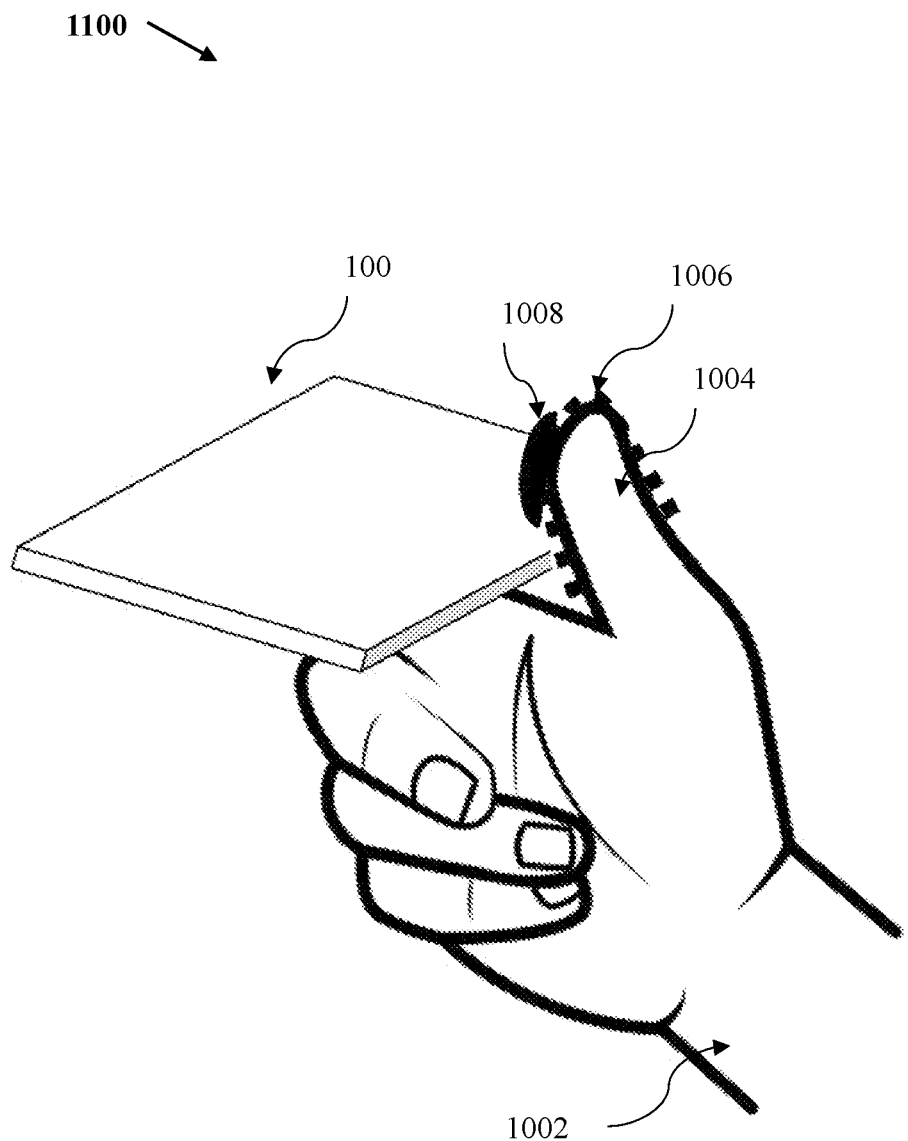
FIG. 11 is a diagram that illustrates a finger glove for use with the wearable input device, in accordance with an exemplary embodiment of the present disclosure.

FIG. 11 is a diagram 1100 that illustrates a finger glove 1006 for use with the wearable keyboard 100, in accordance with an exemplary embodiment of the present disclosure. The user may wear the finger glove 1006 on a finger, for example, a thumb 1004. The finger glove 1006, also known as a touch glove or conductive glove, is a type of glove designed to be worn on the fingertips or whole hand to enable touch-based input on electronic devices, such as a touch screen or touch-based keyboard 104 of the wearable keyboard 100. The glove 1006 is made of conductive materials that allow the finger 1004 to close a circuit when it touches the surface of the device, which sends a signal to the device's controller or processor. This signal corresponds to an operation performed by the user, such as typing a letter or clicking a button. The finger glove 1006 is often used in situations where the user needs to use electronic devices in cold environments, where gloves are required for warmth, or in situations where direct contact with the device is not possible, such as in medical or industrial settings where gloves are required for hygiene or safety reasons. The finger glove 1006 may be designed to include a conductive tip 1008 at the end of the finger to perform touch operations on the touch-based keyboard 104. The conductive tip 1008 may be made of a conductive material such as silver or copper, which allows for the transfer of electrical signals between the finger 1004 and the keyboard 104. The glove itself can be made of a stretchable, comfortable material that fits snugly on the user's finger 1004, providing them with tactile feedback while typing on the keyboard 104. This type of finger glove 1006 can be particularly useful for touch-typing or when using a touch-based keyboard 104 on a small device such as a smartphone or tablet, where precision and accuracy are important.

Figure 12:
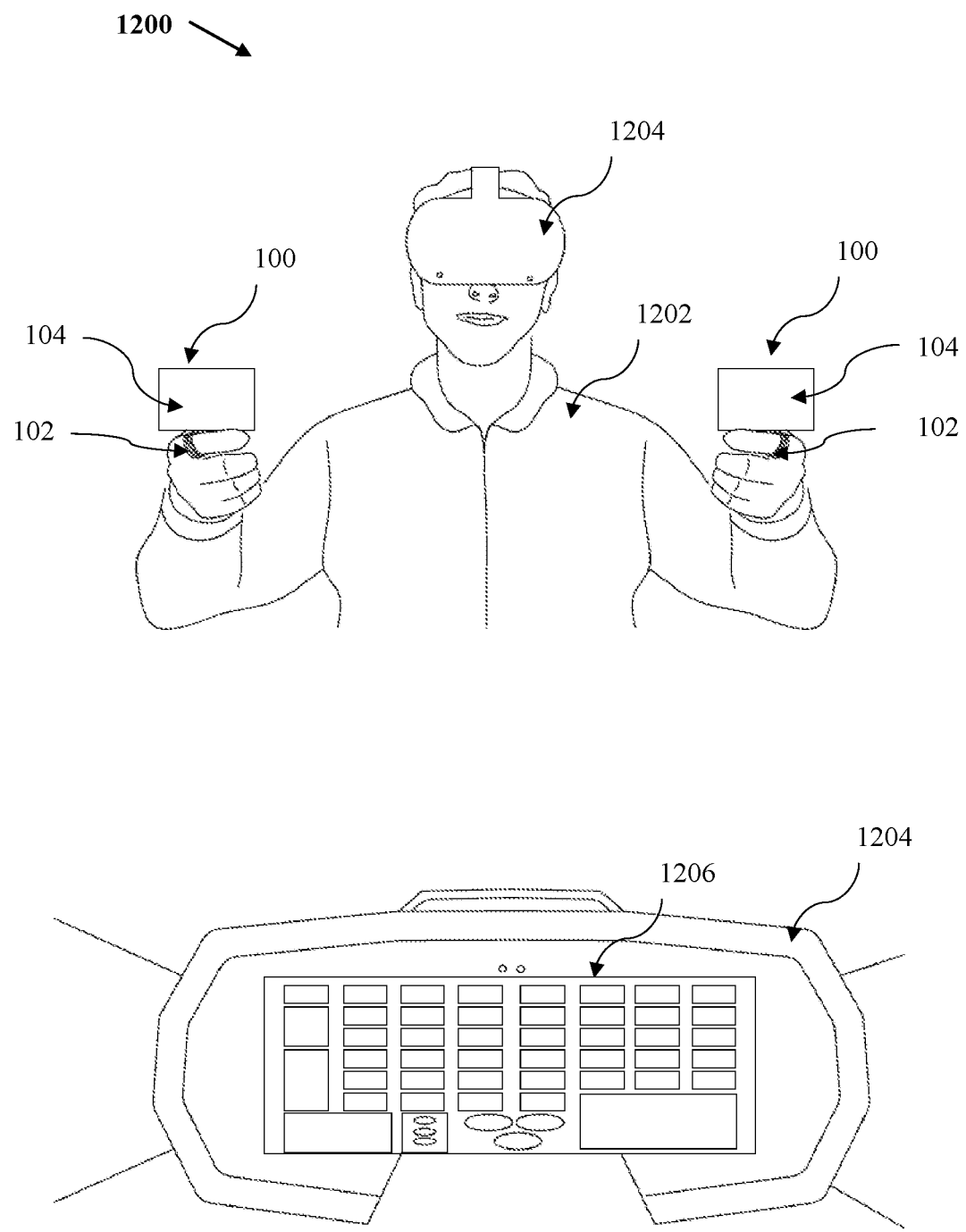
FIG. 12 is a diagram that illustrates a user with multiple wearable input device and an AR/VR device, in accordance with an exemplary embodiment of the present disclosure.

FIG. 12 is a diagram that illustrates a user 1202 with multiple wearable input devices 100 and an AR/VR device 1204, in accordance with an exemplary embodiment of the present disclosure. As shown, the user 1202 is wearing the multiple wearable input devices 100 in his both hands through their rings 102. Each wearable input device 100 includes the keyboard 104 that is removably or permanently attached to the ring 102. In this scenario, the user 1202 is wearing two wearable keyboards 100, one on each hand's finger, via the respective ring 102. The user 1202 is also wearing a head-mounted device such as the AR/VR device 120 on the head. The user 1202 can operate both the keyboards 104 by using their fingers such as the thumb. The configuration allows a virtual keyboard 1206 to be projected on the display of the AR/VR device 1204 when the user 1202 is using both keyboards 104 at the same time, or one at a time. For example, the user 1202 can use the right-hand keyboard 104 for typing and the left-hand keyboard 104 as a touchpad or display or even for typing in a different language, or vice-versa. As the user 1202 is using the keyboards 104, they can see what they are doing on the projected keyboard 1206 on the display of the AR/VR device 1204. This configuration allows the user 1202 to work more efficiently with multiple keyboards, as they can easily switch between keyboards or use both simultaneously without needing to physically move the keyboards or look at them directly. In a gaming application, the user 1202 can use the right-hand keyboard 104 for controlling the movement of the game character and the left-hand keyboard 104 for performing various in-game actions such as firing, jumping, or reloading. For example, the left-hand keyboard 104 can be used to control the character's movement, while the right-hand keyboard 104 can be used to perform various actions. As the user 1202 is playing the game, the user 1202 can see the projected keyboard 1206 on a small portion of the display of the AR/VR device 1204. This way, the user 1202 can keep track of the actions being performed and the keys being pressed without having to take their focus away from the game. This setup can provide a more intuitive and immersive gaming experience, allowing the user 1202 to interact with the game environment more seamlessly. The keyboard 104 can be configured to various above functionalities by setting or selecting one or more parameters from the settings menu of the software application.

Figure 13:
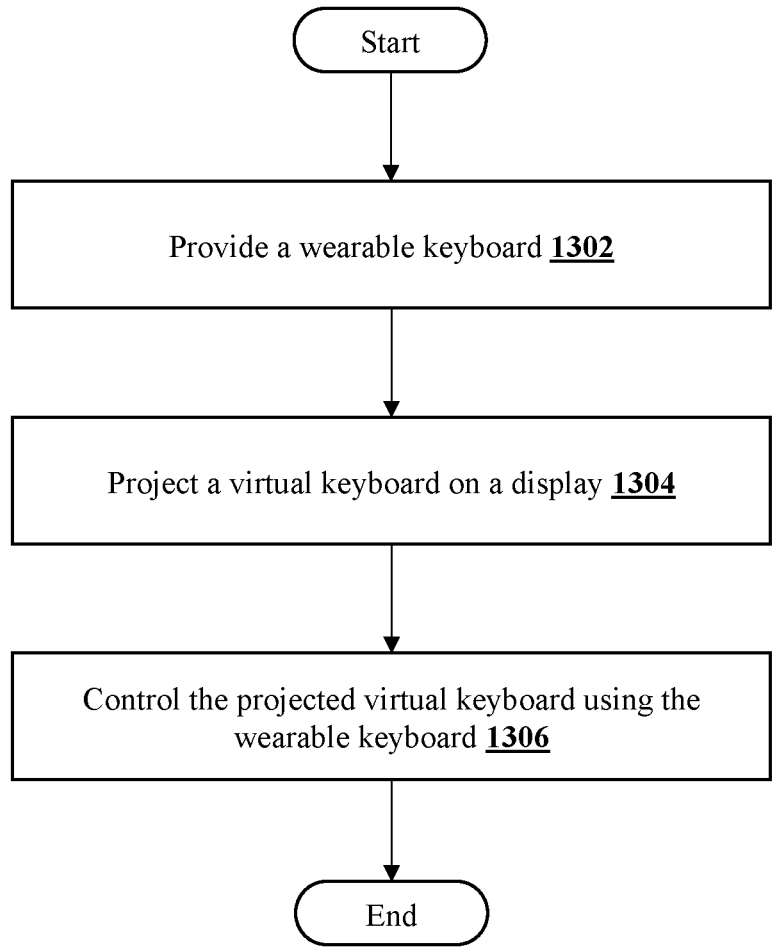
FIG. 13 is a diagram that illustrates a high level flowchart of using the wearable input device with an external device, in accordance with an exemplary embodiment of the present disclosure.

FIG. 13 is a diagram 1300 that illustrates a high level flowchart of using the wearable keyboard 100 with an external device, in accordance with an exemplary embodiment of the present disclosure. The flowchart specifically discloses a method for inputting data into the electronic device that is communicatively connected to the wearable keyboard 100. At step 1302, the wearable keyboard 100 is provided to a user. The wearable keyboard 100 includes the ring 102 configured to be worn on a finger, and the keyboard 104 located on the ring 102 as described above and shown in figures. At step 1304, a virtual keyboard is projected on a display of the electronic device. The virtual keyboard may be displayed onto the display screen of the electronic device. The virtual keyboard may be projected when the wearable keyboard 100 is turned ON. The virtual keyboard may correspond to the keyboard 104 (e.g., a replica of the keyboard 104) located on the ring 102. The keyboard 104 may be used by the user to input data that is visible on the virtual keyboard. At 1306, the projected virtual keyboard may be controlled using the keyboard 104. This method utilizes several technologies to achieve its functionality.

Firstly, the wearable keyboard 100 itself is a technological device that must be developed. The keyboard 104 could potentially use mechanical switches, capacitive touch sensors, or other input methods to detect key presses. The ring 102 itself could be made of a variety of materials, such as plastic, metal, or silicone. The wearable keyboard 100 would likely include a battery to power its projection and other electronics, such as a microcontroller to interpret the input from the physical keyboard and project the virtual keyboard. Secondly, the projection technology used to display the virtual keyboard must be considered. The wearable keyboard 100 could potentially use laser projection or other projection technologies to display the virtual keyboard on the electronic device's display screen. The resolution and brightness of the projection must be sufficient for the virtual keyboard to be legible and usable. Thirdly, the electronic device itself must support the virtual keyboard projection.

This could potentially involve developing software that recognizes the wearable keyboard 100 and automatically projects the virtual keyboard when the device detects the wearable keyboard's presence. The virtual keyboard could also be controlled using the electronic device's touch screen or other input methods.

Figure 14:
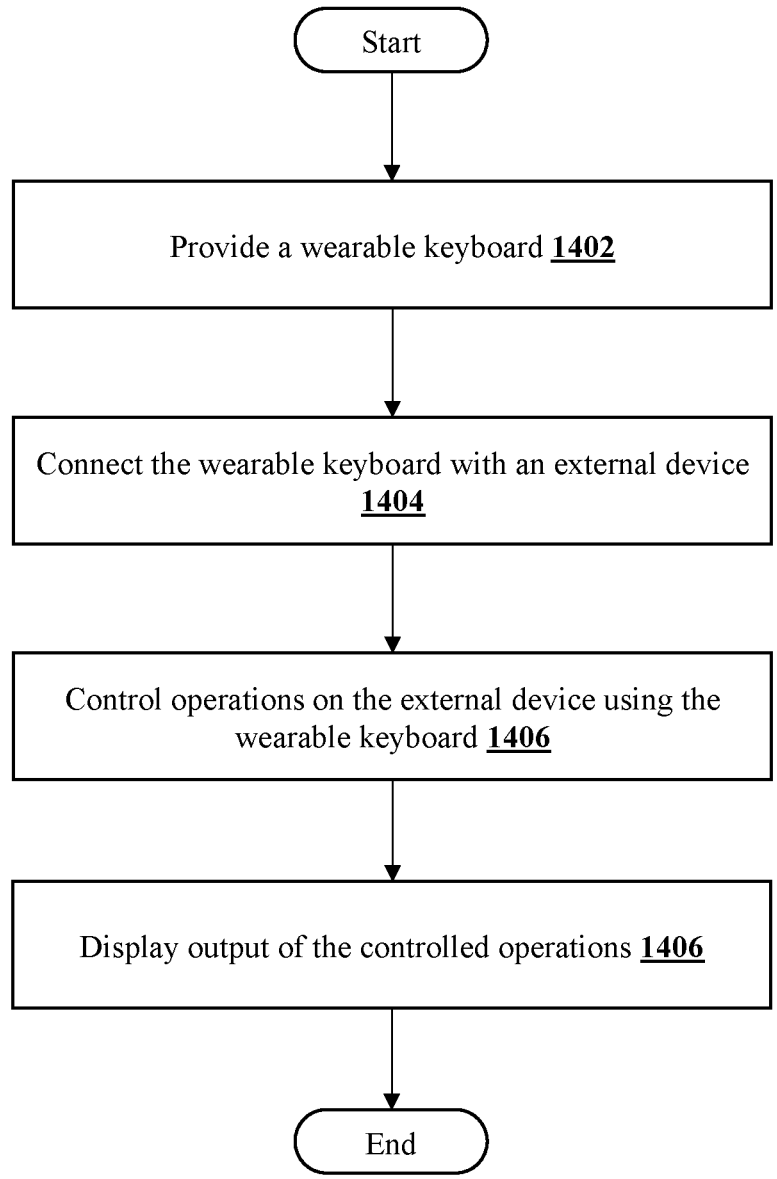
FIG. 14 is a diagram that illustrates a high level flowchart of using the wearable input device with an external device, in accordance with another exemplary embodiment of the present disclosure.

FIG. 14 is a diagram 1400 that illustrates a high level flowchart of using the wearable keyboard 100 with an external device, in accordance with another exemplary embodiment of the present disclosure. The flowchart specifically discloses a method for operating the wearable keyboard 100. At step 1402, the wearable keyboard 100 is provided to a user. The wearable keyboard 100 includes the ring 102 configured to be worn on a finger, and the keyboard 104 located on the ring 102 as described above and shown in figures. At step 1404, the wearable keyboard 100 may be communicatively connected with an external device via a wireless or wired communication network. At step 1406, one or more operations are controlled. These operations may be related to what is being displayed on the external device by using the keyboard 104 located on the ring 102. The one or more operations may be controlled by detecting a user input on the keyboard 104 and transmitting the detected input to the external device. At 1408, an output of the controlled operation(s) is displayed on the external device. This may allow the user to visually see one or more effects of their input on the wearable keyboard 100 by experiencing the output on the external device. Several technologies are involved in this method of operating the wearable keyboard 100.

Firstly, the wearable keyboard 100 itself is a technological device that must be developed. The keyboard 104 could use mechanical switches, capacitive touch sensors, or other input methods to detect key presses. The ring 102 could be made of a variety of materials, such as plastic, metal, or silicone. The wearable keyboard 100 would likely include a battery to power its electronics, such as a microcontroller to interpret the input from the physical keyboard and transmit it to the external device. Secondly, the wireless or wired communication network used to connect the wearable keyboard 100 to the external device must be considered. For example, the wearable keyboard 100 could use Bluetooth to wirelessly connect to a smartphone or laptop. Alternatively, the wearable keyboard 100 could be physically connected to the external device using a USB cable. Thirdly, the external device itself must be able to receive input from the wearable keyboard 100 and display the output of the controlled operations. This could potentially involve developing software that recognizes the wearable keyboard 100 and interprets its input. The external device must also be able to display the output of the controlled operations, which could involve programming graphical user interfaces (GUIs) or other display technologies. Examples of the method for operating the wearable keyboard 100 could include using the keyboard 104 to control a presentation on a laptop, where the ring 102 is worn on the finger of the presenter. The presenter could advance slides, play videos, or pause the presentation using the keyboard 104 located on the ring 102. Another example could be using the keyboard 104 to control a video game on a smartphone, where the ring 102 is worn on the finger of the player. The player could move their character, shoot, or jump using the keyboard 104 located on the ring 102.

The above two methods offer unique advantages in terms of portability, convenience, novelty, privacy, mobility, hands-free operation, accessibility, and convenience. These advantages make the methods appealing for a variety of applications, ranging from casual use to professional settings. However, the wearable keyboard 100 (including the ring(s) 102 and the keyboard 104 attached to or located on the ring(s) 102) that can be worn on the user's finger(s) 602 has several advantages such as:

Portability: The wearable keyboard 100 is very portable and can be easily carried around. It is much smaller and lighter than a regular keyboard, making it ideal for use while traveling.

Convenience: The wearable keyboard 100 is very convenient to use, as it can be worn on a finger and used wherever and whenever required. It eliminates the need to carry a bulky keyboard, which can be inconvenient and cumbersome.

Mobility: The wearable keyboard 100 allows for greater mobility, as the user can type while standing, walking, or even running. This makes it ideal for use in situations where the user is on the move.

Efficiency: The wearable keyboard 100 is very efficient and can be used to type quickly and accurately. It is also more ergonomic than a regular keyboard, as the user can type using a natural hand posture.

Accessibility: The wearable keyboard 100 can be worn by people with disabilities that limit their hand or arm movements. This makes it more accessible for people who have difficulty typing on a regular keyboard.

Versatility: The wearable keyboard 100 can be used to connect with various devices like mobiles, laptops, computers, printers, AR/VR devices, and more, making it a versatile option for typing.

Novelty: The wearable keyboard 100 and projected virtual keyboard have a unique and futuristic look, which could appeal to users who are interested in new and innovative technologies.

Privacy: The wearable keyboard 100 and projected virtual keyboard may offer increased privacy, as users can input data without anyone else seeing what they are typing.

With the wearable keyboard 100, the users can type and input commands while on the go, without the need for a stationary keyboard or mouse. This allows for increased mobility and flexibility when using AR/VR devices. AR/VR devices often have limited input options, such as gesture-based controls or handheld controllers. The wearable keyboard 100 provides the users with an additional input option that is more familiar and intuitive, leading to an improved user experience. With the wearable keyboard 100, the users can type and input commands more quickly and accurately than with other input methods, such as voice commands or gesture-based controls. This can lead to increased productivity when using AR/VR devices for work or other tasks. For the users with physical disabilities or limitations, the wearable keyboard 100 can provide a more accessible input option than other methods, such as gesture-based controls. This can improve the overall accessibility and inclusivity of AR/VR devices. With the wearable keyboard 100, the users do not need to rely on memorizing complex gesture-based controls or navigating through menus to input commands. This can reduce the cognitive load required to use AR/VR devices and make the overall experience more intuitive and seamless.

Further, with the display (as shown by 116 in FIGS. 1b and 210 in FIG. 2) on the wearable keyboard 100, the users can view and interact with their work directly, making it more convenient and easier to use. The display on the wearable keyboard 100 can help users to work more efficiently, as they can see their work and make changes in real-time without needing to switch between different devices. Further, using the display on the wearable keyboard 100 can reduce eye strain, as users do not need to constantly shift their focus between different screens or devices. Further, with the display on the wearable keyboard 100, the users can work on sensitive information without needing to worry about others viewing their work on a separate screen. Further, the wearable keyboard 100 with covering and folding options can be easily carried around by the user. The ability to cover and fold the keyboard 104 means that it can be easily stored in a bag or pocket without taking up much space. The covering and folding of the keyboard 104 can provide protection from external factors such as dust, dirt, and water. This is especially important in outdoor and industrial environments where the keyboard 104 may be exposed to harsh conditions. The covering and folding options may be customized to fit the user's needs. For example, the user may prefer a specific way to fold the keyboard 104 for easier access to certain keys. This level of customization can improve the user's typing speed and accuracy. The covering and folding options can increase the durability of the keyboard 104. The covering can protect the keyboard 104 from wear and tear, and the folding options can prevent the keyboard 104 from breaking or cracking due to accidental drops. The covering and folding options can provide improved accessibility for users with disabilities. The keyboard 104 can be folded or covered in a way that makes it easier to use for users with limited mobility or dexterity. Overall, the wearable keyboard 100 is a highly convenient and efficient way of typing that provides greater mobility and accessibility than a regular keyboard and provide improved portability, protection, customization, durability, and accessibility for the user.

While the present system has been described with reference to exemplary embodiments, it should also be appreciated that numerous modifications and alternative embodiments may be devised by those having ordinary skill in the art without departing from the broader and intended spirit and scope of the present system as set forth in the claims that follow.

While various exemplary embodiments of the disclosed wearable keyboard 100 have been described above, it should be understood that they have been presented for the purpose of example and illustration only and should not be construed as limiting to the scope of the present invention. It is not exhaustive and does not limit the disclosure to the precise form disclosed. Modifications and variations are possible considering the above teachings or may be acquired from practicing of the disclosure, without departing from the breadth or scope of the present invention. Further, any of the disclosed elements may be comprised of hardware portions (e.g., including discrete and integrated electronic circuitry), software portions (e.g., computer programming), and any combination thereof. Further, hardware portions may be comprised of one or both of analog and digital to portions. Further, any of the disclosed devices, portions thereof, acts, etc., may be combined together or separated into further portions, acts, etc., unless specifically stated otherwise.

To aid the Patent Office, and any readers of any patent issued on this application in interpreting the claims appended hereto, applicants wish to note that they do not intend any of the appended claims to invoke paragraph 6 of 35 U.S.C. § 112, U.S.C. § 112 paragraph (f), or equivalent, as it exists on the date of filing hereof unless the words "means for" or "step for" are explicitly used in the particular claim.

For each of the claims, each dependent claim can depend both from the independent claim and from each of the prior dependent claims for each and every claim so long as the prior claim provides a proper antecedent basis for a claim term or element.

What is claimed is:

1. A wearable input device, comprising:
   a ring comprising a frame defining a space to receive a finger of a user; and
   a keyboard removably attached to the frame and held in place by a locking mechanism, wherein the keyboard comprises a plurality of physical keys comprising alphanumeric keys, control keys, function keys, navigation keys and special purpose keys and, is configured to communicate with one or more application devices communicatively coupled with the keyboard, wherein the special purpose keys are integrated with one or more three-dimensional (3D) gesture sensors configured to capture one or more gestures of the user in a 3D frame and execute one or more operations associated with the one or more gestures.

2. The wearable input device of claim 1, further comprising one or more slots on an outer surface of the frame, wherein the keyboard is removably attached to the one or more slots.

3. The wearable input device of claim 2, wherein the one or more slots comprise one or more magnetic slots.

4. The wearable input device of claim 1, wherein the keyboard further comprises a battery holder located along a side edge of the keyboard and configured to hold one or more batteries as a power source for the keyboard.

5. The wearable input device of claim 1, wherein the keyboard further comprises a connector located along a side edge of the keyboard and configured to transfer data, provide power, or charge one or more batteries.

6. The wearable input device of claim 1, wherein the keyboard further comprises one or more indicator buttons, which when turned ON, are configured to generate one or more indication lights that indicate an ON/OFF status of the keyboard, a pairing/unpairing status of the keyboard with the one or more application devices, an error status of the keyboard, an update status of the keyboard, or a high/low charging level of one or more batteries of the keyboard.

7. The wearable input device of claim 1, wherein the special purpose keys enhance a security of the keyboard.

8. The wearable input device of claim 1, wherein the special purpose keys are integrated with one or more fingerprint sensors configured to verify an identity of the user.

9. The wearable input device of claim 1, wherein the special purpose keys are integrated with one or more camera sensors configured to perform facial recognition and one or more microphone sensors configured to perform voice recognition.

10. The wearable input device of claim 1, wherein the one or more gesture sensors further comprise two-dimensional (2D) gesture sensors that sense movement of one or more fingers in a 2D frame.

11. The wearable input device of claim 1, wherein the one or more operations based on the one or more captured gestures simulate a mouse or touch pad functionality in an area of the keyboard, wherein the one or more captured gestures correspond to a movement of one or more fingers in a horizontal plane to simulate a horizontal movement of a cursor on a display screen, or the movement of the one or more fingers in a vertical plane to simulate one or more taps or a vertical movement of the curser on the display screen.

12. The wearable input device of claim 1, wherein the keyboard further comprises a touch pad, keys and indicators, a pen holder, and a touchscreen display, which is an assembly of both a touch panel and a display panel.

13. The wearable input device of claim 1, wherein the plurality of physical keys on the keyboard further comprise at least one or more activation/deactivation keys configured to activate or deactivate the keyboard, or activate or deactivate one or more functions of the keyboard comprising typing, sensor(s) or moving a cursor.

14. The wearable input device of claim 12, wherein the touch pad includes a plurality of touch pad units (TPUs).

15. The wearable input device of claim 14, further comprising a glove or a wearable tip configured to complete an electrical connection between two adjacent TPUs, and a processor in the keyboard that is configured to receive one or more signals based on the completed electrical connection and executes one or more related operations in response to the one or more signals.

16. The wearable input device of claim 1, wherein the keyboard is configured to project a virtual keyboard onto a display screen of one of the one or more application devices allowing the user to interact with the virtual keyboard using the keyboard.

17. The wearable input device of claim 1, further comprising:
    at least one additional ring comprising an additional frame defining an additional space to receive another finger of the user; and
    wherein the keyboard is further removably attached to the additional frame and held in place by an additional locking mechanism.

18. The wearable input device of claim 2, wherein the one or more slots comprise one or more screwing slots.

19. The wearable input device of claim 2, wherein the one or more slots comprise one or more plug-in slots.

20. The wearable input device of claim 12, wherein the touchscreen display includes a touch-sensitive screen that allows the user to interact with the keyboard through a combination of the physical keys and on-screen touch controls, and wherein the touchscreen display is configured to be used for at least typing, accessing functions, customizing keyboard layout, showing a current mode of operation, and showing a battery life of one or more batteries of the keyboard.

21. The wearable input device of claim 12, wherein the touchscreen display provides a flexible and customizable interface for the user to interact with the one or more application devices.

22. The wearable input device of claim 16, wherein the keyboard is configured to detect finger gestures, which are transmitted wirelessly to the one or more application devices for processing, wherein the one or more application devices are configured to interpret the finger gestures and display the corresponding characters on the virtual keyboard, allowing the user to type and interact without physically touching the keyboard.

23. A method for inputting data into an electronic device, comprising:
    providing a first wearable keyboard comprising a first ring configured to be worn on a left-hand finger of a user, and a first keyboard located on the first ring and held in place by a first locking mechanism;
    providing a second wearable keyboard comprising a second ring configured to be worn on a right-hand finger of the user, and a second keyboard located on the second ring and held in place by a second locking mechanism;
    projecting one or more virtual keyboards onto a display screen of an electronic device when the first and second keyboards are turned ON, wherein the one or more virtual keyboards correspond to the first and second keyboards, and the first and second keyboards are used to input data that is visible on the one or more virtual keyboards; and
    controlling the projected one or more virtual keyboards using the first and second keyboards.

24. The method of claim 23, wherein the first keyboard is used for performing one type of activity and the second keyboard is used for performing another type of activity, and wherein both the activities are interrelated to each other.

25. The method of claim 23, wherein the electronic device is a head-mounted device, wherein the one or more virtual keyboards are projected on a display of the head-mounted device when the user is using both keyboards, and wherein the one or more virtual keyboards on the head-mounted device allows the user to see what the user is doing when the user is using both the keyboards.

26. A method for operating a wearable physical keyboard, comprising:
    providing the wearable keyboard comprising a ring configured to be worn on a finger, and a keyboard removably attached to the ring and held in place by a locking mechanism, wherein the keyboard comprises a plurality of physical keys comprising alphanumeric keys, control keys, function keys, navigation keys, and special purpose keys, and the special purpose keys are integrated with one or more three-dimensional (3D) gesture sensors configured to capture one or more gestures of the user in a 3D frame and execute one or more operations associated with the one or more gestures;
    communicatively connecting the keyboard with an external device via a wireless or wired communication network;
    detecting an input on the keyboard;
    transmitting the input to the external device using the wireless or wired communication network;
    controlling one or more operations related to what is being displayed on the external device using the transmitted input; and
    displaying an output of the one or more controlled operations on the external device that visually depicts one or more effects of the input on the keyboard.

27. The method of claim 26, further comprising configuring the device for one or more functionalities using a software application.

* * * * *